United States Patent
Bala et al.

(10) Patent No.: US 8,076,426 B2
(45) Date of Patent: Dec. 13, 2011

(54) SUPRAMOLECULAR POLYMERS

(75) Inventors: Kason Bala, Reading (GB); Helen Claire Hailes, London (GB); Valerie Gisele Helene Lafitte, London (GB); Abil Aliev, London (GB); Peter Golding, Reading (GB)

(73) Assignee: The Secretary of State for Defence (GB)

( * ) Notice: Subject to any disclaimer, the term of this patent is extended or adjusted under 35 U.S.C. 154(b) by 518 days.

(21) Appl. No.: 12/158,123

(22) PCT Filed: Dec. 20, 2006

(86) PCT No.: PCT/GB2006/004823
§ 371 (c)(1),
(2), (4) Date: Jul. 28, 2008

(87) PCT Pub. No.: WO2007/072000
PCT Pub. Date: Jun. 28, 2007

(65) Prior Publication Data
US 2009/0005519 A1 Jan. 1, 2009

(30) Foreign Application Priority Data
Dec. 21, 2005 (GB) .................................. 0525970.0

(51) Int. Cl.
C08G 77/26 (2006.01)
(52) U.S. Cl. ........................................ 525/474; 528/27
(58) Field of Classification Search .................. 525/474; 528/27
See application file for complete search history.

(56) References Cited

U.S. PATENT DOCUMENTS

| | | | |
|---|---|---|---|
| 6,777,387 B2 | 8/2004 | Greenwald et al. | |
| 7,622,131 B2 * | 11/2009 | Bosman et al. | 424/401 |
| 2002/0015691 A1 | 2/2002 | Greenwald et al. | |
| 2004/0023155 A1 | 2/2004 | Hayakawa et al. | |

FOREIGN PATENT DOCUMENTS

| | | |
|---|---|---|
| JP | 51-146481 | 12/1976 |
| WO | WO 98/14504 | 4/1998 |
| WO | WO 02/016381 A2 | 2/2002 |
| WO | WO 02/016381 A3 | 2/2002 |

OTHER PUBLICATIONS

Dutta, et al., 'Synthesis and Properties of the Naturally Occurring N[9-β-D-Ribofuranosylpurin-6-yl)-N-methylcarbamoyl]-L-threonine (mt$^6$A) and Other Related Synthetic Analogs,' *Biochemistry*, 14(14):3144-3151 (1975).
Dutta, et al., 'Synthesis and Properties of N-Carbamoyl Derivatives of Cytosine, Cytidine, Uracil and Thymine,' *J. Carbohydrates-Nucleosides-Nucleotides*, 7(4):217-240 (1980).
Lafitte, et al., 'Quadruply Hydrogen Bonded Cytosine Modules for Supramolecular Applications,' *J. Am. Chem. Soc.*, 128:6544.6545 (2006).
Miyata, et al., 'Synthesis and hybridization affinity of oligodeoxyribonucleotides incorporating 4-N-(N-arylcarbamoyl)deoxycytidine derivatives,' *Tetrahedon Letters*, 45(51):9365-9368 (2004).
Segal, et al., 'Isolation of Methylcarbamoyl-Adducts of Adenine and Cytosine Following in Vitro Reaction of Methyl Isocyanate with Calf Thymus DNA,' *Chem.-Biol. Interactions*, 69(4):359-372 (1989).
Sigmund, et al., 'A New Type of Fluorescence Labeling of Nucleosides, Nucleotides and Oligonucleotides,' *Nucleosides & Nucleotides*, 16(5&6):685-696 (1997).
Sigmund, et al., '115.Nucleosides Part LVI1) Aminolysis of Carbamates of Adenosine and Cytidine,'*Helvetica Chimica Acta*,1267-1280 (1994).
Sivakova, et al., 'Utilization of a Combination of Weak Hydrogen-Bonding Interactions and Phase Segregation to Yield Highly Thermosensitive Supramolecular Polymers,' *J. Am. Chem. Soc.*, 127:18202-18211 (2005).

* cited by examiner

*Primary Examiner* — Kuo-Liang Peng
(74) *Attorney, Agent, or Firm* — Dean W. Russell; Christopher M. Durkee; Kilpatrick Townsend & Stockton LLP

(57) ABSTRACT

The invention concerns novel cytosine based modules and in particular their application in linear multiple hydrogen bonded arrays to form supramolecular polymers of the formula (II): and the use of these in supramolecular materials.

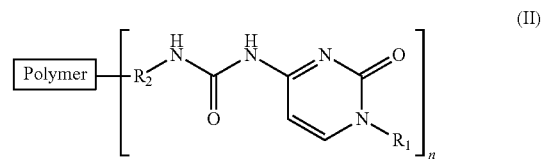

6 Claims, 7 Drawing Sheets

SUPRAMOLECULAR POLYMERS

CROSS REFERENCE TO RELATED APPLICATIONS

This application is the U.S. national phase of International Application No. PCT/GB2006/004823 filed on Dec. 20, 2006 and published in English on Jun. 28, 2007 as International Publication No. WO 2007/072000 A1, which application claims priority to Great Britain Application No. 0525970.0 filed on Dec. 21, 2005, the contents of both of which are incorporated herein by reference.

The invention concerns cytosine based modules and in particular their application in linear multiple hydrogen bonded arrays to form supramolecular polymers.

Supramolecular structures are created from organic compounds which are formed from the non-covalent bonding of monomer, oligomer or polymeric core modules as building blocks. The most important feature of supramolecular chemistry is that the building blocks are reversibly held together by intermolecular forces—non-covalent self-assembly. The bond formation between atoms in molecular chemistry is based on covalent assembly, which is kinetically or thermodynamically controlled. This non-covalent synthesis enables the building up of supramolecular entities having architectures and features that are sometimes extremely difficult to prepare by covalent synthesis.

The use of self-complimentary hydrogen bonding in a supramolecular structure is an example of a strong, in terms of bond strength, non-covalent association where hydrogen bonds are the only force keeping the core modules together. These structures exist under thermodynamic equilibrium so can be used to generate supramolecular polymers which respond to a change in external stimuli (e.g. temperature or solvent). The use of quadruple hydrogen bonds has been demonstrated to increase both the strength and specificity of hydrogen bonding interactions. Supramolecular materials are required to exhibit a broad range of properties because of their many industrial applications, for example, in thermoplastic elastomers, cosmetics and superglues.

The physical properties of supramolecular materials (e.g. glass transition temperature, melting point, viscosity) can be tailored according to the polymer, the core modules used, the synthesis method and the type of hydrogen bonding array used. Also, synthesis of core modules capable of forming strong hydrogen bonds is particularly desirable. The synthesis of supramolecular polymers based on the self-assembly of DDAA modules (Donor and Acceptor) has previously been reported in WO 98/14504 as being mainly restricted to the ureidopyrimidinones (UPy). UPy modules have been chemically incorporated within polymers to produce supramolecular materials with improved processing properties in melt or solution whilst maintaining physical properties in the solid state.

Functionalised UPy motifs have been reacted with a wide range of polymers to produce self-assembled supramolecular polymers held together by quadruple hydrogen bonds via self-complimentary association. Although UPy modules are synthetically accessible and form strong hydrogen bonding arrays, they can exist in three different tautomeric forms depending on environment, that is, solvent, concentration, temperature. The presence of tautomers has the disadvantage that it can increase the complexity of the species present limiting the design of materials where controlled supramolecular materials are a requirement. This could potentially lead to mechanical ageing and hence compromise the physical properties of the supramolecular material compared to its original physical state. One approach to reduce the number of tautomers is by the replacement of NH moieties with CH groups, or NH with NR to give "UPy-base" modules. However, this can result in conformation flexibility in the ureido fragment between folded and unfolded forms. It is therefore desirable to inhibit such tautomeric effects in order to design materials that possess controlled supramolecular characteristics.

Those skilled in the art will appreciate that the structure of UPy affords for additional intramolecular hydrogen bonding in the core module. Some structures containing the UPy motif have been shown to have limited solubility in solvents. This makes the incorporation of functionalised polymers and the subsequent generation of new supramolecular materials based on UPy synthetically challenging.

Furthermore, the exclusive use of UPy modules in a supramolecular material limits the number of different physical properties obtainable in the resultant material. Therefore, it would be advantageous to explore alternative hydrogen bonding modules, which can be used in polymer or co-polymer synthesis via the self or hetero-association of complimentary units for application in supramolecular material design.

The invention aims to achieve an improvement in supramolecular material characteristics by synthesising core modules that do not undergo the effects of tautomerism or intramolecular hydrogen bonding to allow the production of supramolecular materials with more varied and controllable properties and improved solubility.

Herein, we describe a novel functionalised cytosine module. Cytosine, being one of the three major pyrimidines, is known for its hydrogen bonding capabilities in DNA and RNA. Numerous cytosine derivatives are known for use in biological applications but none have been reported for use in material applications. In supramolecular polymer self assembly they offer a great potential due to the presence of heteroatoms acting as donors and acceptors for hydrogen bonding.

Utilisation of a cytosine based monomer, functionalised at the primary amine, overcomes the problems set out by means of the compound of the formula I:

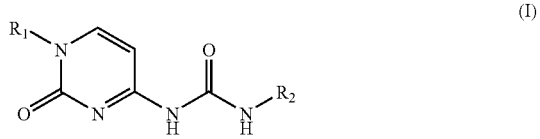

Wherein:
$R_1$ is an alkyl, alkenyl, alkoxy, alkoxy ether, aryl, aryloxy, per-fluorinated, cyclic or heterocyclic carbohydrate based group or a UV active chromaphore;
$R_2$ is an alkyl, alkenyl, alkoxy, alkoxy ether, aryl, aryloxy, per-fluorinated, cyclic or heterocyclic carbohydrate based group.

Alternatively,
$R_1$ is a branched or linear $C_1$-$C_{20}$ alkyl, $C_1$-$C_{20}$ alkenyl, $C_1$-$C_{20}$ alkoxy, $C_1$-$C_{20}$ alkoxy ether, aryl, aryloxy, per-fluorinated, cyclic or heterocyclic carbohydrate based group or a UV active chromaphore;
$R_2$ is a branched or linear $C_1$-$C_{20}$ alkyl, $C_1$-$C_{20}$ alkenyl, $C_1$-$C_{20}$ alkoxy, $C_1$-$C_{20}$ alkoxy ether, aryl, aryloxy, per-fluorinated, cyclic or heterocyclic carbohydrate based group.

In a further embodiment, $R_1$ and $R_2$ can be selected to covalently bond to each other.

The skilled man will appreciate, as side chains, $R_1$ and $R_2$ may in principle represent any group that is inert in the formation of a supramolecular polymer. The number of C atoms present is in no way critical.

Compounds of the formula (I) do not undergo tautomeric exchange, nor are they capable of forming an intramolecular hydrogen bond, thus overcoming the disadvantage of known UPy modules when used to generate supramolecular materials. Furthermore, compounds of the formula (I) have the added advantage that they are capable of self-assembly via DDAA/AADD interactions or hetero-assembly with another similar unit such as UPy.

Compounds of the formula (I) have the added advantage that whilst they are structurally capable of generating intermolecular hydrogen bonds these bonds are reversible via solvent or heat.

Dimers of the compound of the formula (I) form quadruple hydrogen bonds. These dimers self assemble. Monomers of the compound of the formula (I) will also form dimers having quadruple hydrogen bonds with UPy monomers. These dimers also self assemble.

Using compounds of the formula (I) has the added advantage that the novel hydrogen bonded dimers have high dimerisation equilibrium values ($K_{dim}$) values (>$2\times10^7$ M$^{-1}$), akin to UPy dimers, in apolar solvents enabling the construction of hetero-assembled supramolecular co-polymers.

According to the invention, two or more compounds of the formula (I) can form polymers of the formula (II):

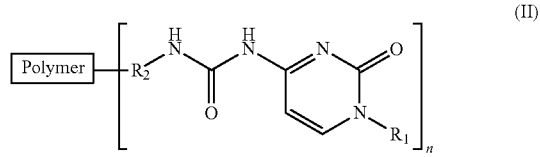

(II)

Wherein:
$R_1$ is independently selected from the group containing:
an alkyl or alkenyl or alkoxy or aryl or aryloxy carbohydrate based group;
OR an alkyl or alkenyl or alkoxy or aryl or aryloxy per-fluorinated carbohydrate based group;
OR an alkyl or alkenyl or alkoxy or aryl or aryloxy cyclic carbohydrate based group;
OR an alkyl or alkenyl or alkoxy or aryl or aryloxy heterocyclic carbohydrate based group;
OR a UV active chromaphore
$R_2$ is independently selected from the group containing:
an alkyd or alkenyl or alkoxy or aryl or aryloxy carbohydrate based group;
OR an alkyl or alkenyl or alkoxy or aryl or aryloxy per-fluorinated carbohydrate based group;
OR an alkyl or alkenyl or alkoxy or aryl or aryloxy cyclic carbohydrate based group;
OR an alkyl or alkenyl or alkoxy or aryl or aryloxy heterocyclic carbohydrate based group
Polymer is independently selected from the group containing any polymeric material between 200 and 500,000 Da $n \geq 2$ Alternatively,
$R_1$ is independently selected from the group containing:
a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy carbohydrate based group;
OR a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy per-fluorinated carbohydrate based group;
OR a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy cyclic carbohydrate based group;
OR a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy heterocyclic carbohydrate based group;
OR a UV active chromaphore
$R_2$ is independently selected from the group containing:
a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy carbohydrate based group;
OR a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy per-fluorinated carbohydrate based group;
OR a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy cyclic carbohydrate based group
OR a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy heterocyclic carbohydrate based group
Polymer is independently selected from group containing: polyethylene glycol, Fluorolink D™, polymethylmethacrylate, polycarbonate, polyorganophosphazene, polysiloxane, polyNIMMO, polyGLYN, polybutylene or polybutadiene $2 \geq n < 50$ The skilled man will appreciate, as side chains, $R_1$ and $R_2$ may in principle represent any group that is inert in the formation of a supramolecular polymer. The number of C atoms present is in no way critical. Furthermore, the skilled man will appreciate the polymer may also be attached at the $R_1$ group in an alternative embodiment of the invention.

Utilising cytosine based modules of the formula (I) in the supramolecular polymer has the additional advantage that they can be used to generated mixed polymer or co-polymer systems via quadruple hydrogen bonds.

Polymers of the formula (II) formed from the compounds of formula (I) have the added advantage that the physical properties of the supramolecular material be can be tuned by stoichiometrically varying the proportion of cytosine units from 0.1 to 100 mole %.

Cytosine based supramolecular polymers of formula (II) are particularly useful in applications where the reprocessing or removal of a material is a requirement.

The applicants have developed a synthetic pathway to the new cytosine core module of formula (I) using commercially available cytosine. Accordingly there is provided a method comprising steps of:
(i) Selectively protecting the primary amine of cytosine using an acid anhydride and base to afford the corresponding amide (e.g. acetic acid anhydride and pyridine);
(ii) Reacting the secondary amine of cytosine with a monofunctional or polyfunctional electrophile (e.g. bromohexane or a group incorporating an UV active functionality) in the presence of a base (e.g. potassium carbonate) to produce a tertiary amine;
(iii) Deprotecting the protecting group present on the primary amine group using basic conditions (e.g. ammonia in methanol); and
(iv) Reacting the resultant primary amine afforded from step (iii) with mono or polyfunctional electrophile (e.g. hexyl isocyanate) to afford the corresponding functionalised cytosine based module of formula (I).

Alternatively, step (iv) comprises activation of the primary amine using N, N carbonyl diimidazole (CDI) to form an electrophile and reaction of the electrophile with a nucleophile (e.g. allyl amine) to afford the corresponding functionalised cytosine based module of formula (I).

The skilled man will appreciate that other base resistant protecting groups for primary amine protection would be equally effective as desirable protecting groups prior to reaction of the secondary amine.

Furthermore, the applicants have developed a synthetic pathway to compounds of formula (II), starting from compounds of the formula (I) comprising steps of:
(i) Functionalising $R_2$ of formula (I) to contain an activated group (e.g. amine or halide); and
(ii) Reacting the functionalised compound of formula (I) with polyfunctionalised polymer in the presence of solvent to afford the corresponding polymer of formula (II).

Additionally, the applicants have developed a synthetic pathway to compounds of the formula (II) starting from commercially available cytosine and using non-isocyanate chemistry. Accordingly there is provided a method comprising steps of:
(i) Selectively protecting of the primary amine of cytosine using an acid anhydride and base to afford the corresponding amide (e.g acetic acid anhydride and pyridine);
(ii) Reacting the secondary amine of cytosine with a monofunctional or polyfunctional electrophile in the presence of a base to produce a tertiary amine (e.g. bromohexane or a group incorporating an UV active functionality) in the presence of a base (e.g. potassium carbonate) to produce a tertiary amine;
(iii) Deprotecting the protecting group present on the primary amine group using basic conditions (e.g. ammonia in methanol); and
(iv) Reacting the resultant primary amine afforded from step (iii) with N, N carbonyl diimidazole (CDI) to form an electrophile and reaction of the electrophile with a polyfunctional polymer to afford the corresponding polymer of formula (II).

The use of non-isocyanate methodology to synthesize compounds of the formula (II) as described offers the additional advantage over the known UPy supramolecular structure synthesis in that toxic respiratory sensitisers nor the addition of chemical catalysts do need to be used in the process.

Furthermore, the formation of cytosine based supramolecular polymers of the formula (II) offers a more environmentally friendly alternative to curing/crosslinking polymers where often isocyanates or free radicals (well known respiratory sensitisers) are commonly used to cross-link polymers.

In an embodiment of the invention, a supramolecular polymer containing units of the formula:

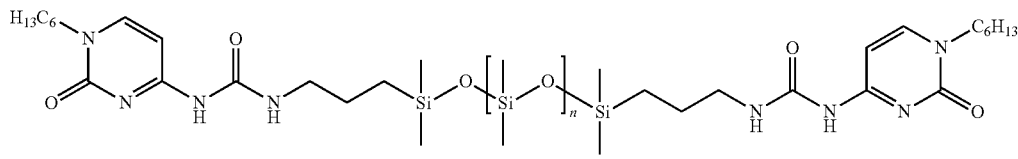

is formed.

In an embodiment of the invention, a supramolecular polymer containing units of the formula:

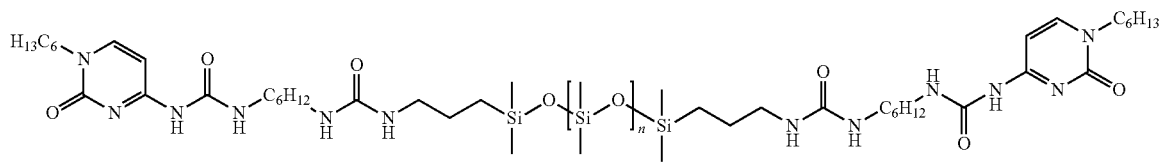

is formed.

In an embodiment of the invention, a supramolecular polymer containing units of the formula:

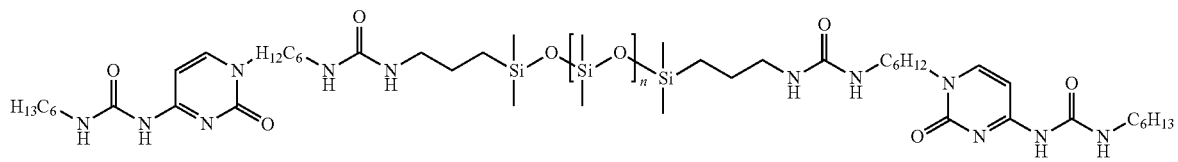

is formed.

In an embodiment of the invention, a supramolecular polymer containing units of the formula:

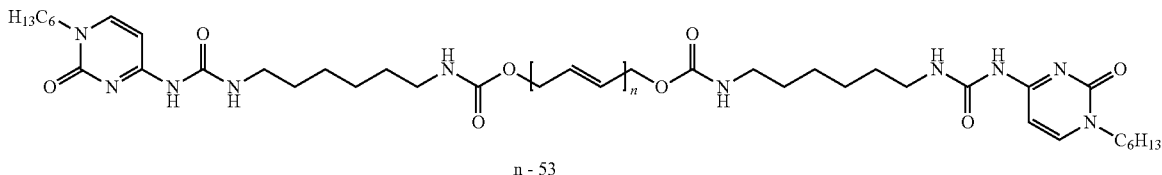

n - 53 is formed.

The novel cytosine based polymers of the formula (II) described can be used in the manufacture of supramolecular materials.

Embodiments of the invention will now be described with reference to the figures, tables and examples below and wherein:

GENERAL EXPERIMENTAL METHODS

Figure 1:
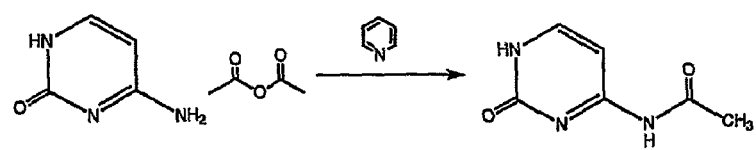
FIG. 1 shows the synthetic route for the preparation of N-4-acetylcytosine
Figure 2:
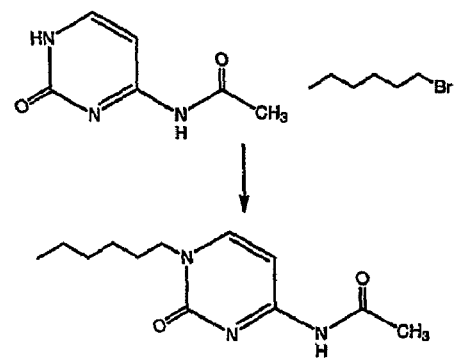
FIG. 2 shows the synthetic route for the preparation of N-(1-Hexyl-2-oxo-1,2-dihydro-pyrimidin-4-yl)-acetamide
Figure 3:
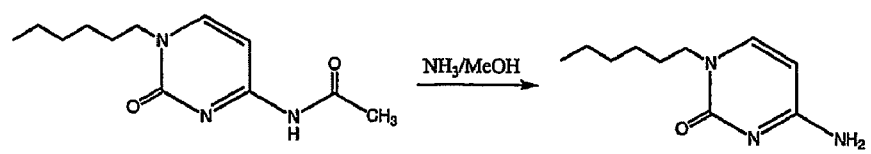
FIG. 3 shows the synthetic route for the preparation of 4-Amino-1-hexyl-1H-pyrimidin-2-one
Figure 4:
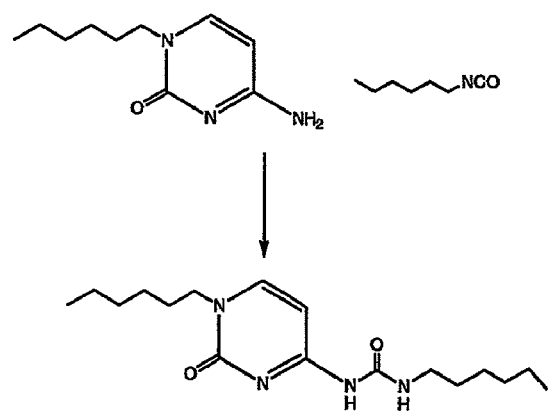
FIG. 4 shows the synthetic route for the preparation of a cytosine module of formula (I), according to the invention, 1-Hexyl-3-(1-hexyl-2-oxo-1,2-dihydro-pyrimidin-4-yl)-urea
Figure 5:
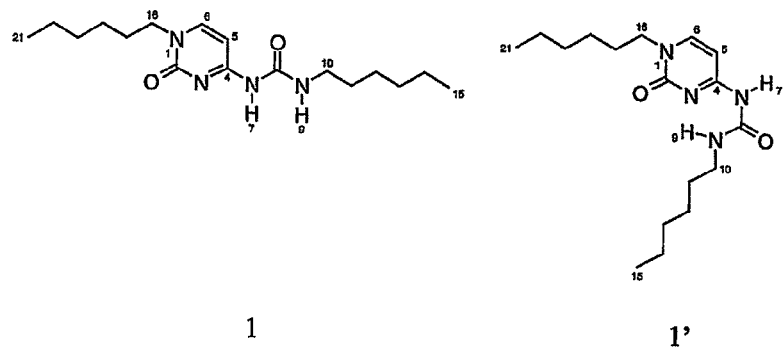
FIG. 5 shows 1-Hexyl-3-(1-hexyl-2-oxo-1,2-dihydro-pyrimidin-4-yl)-urea (Rotamers 1 and 1') of formula (I)
Figure 6:
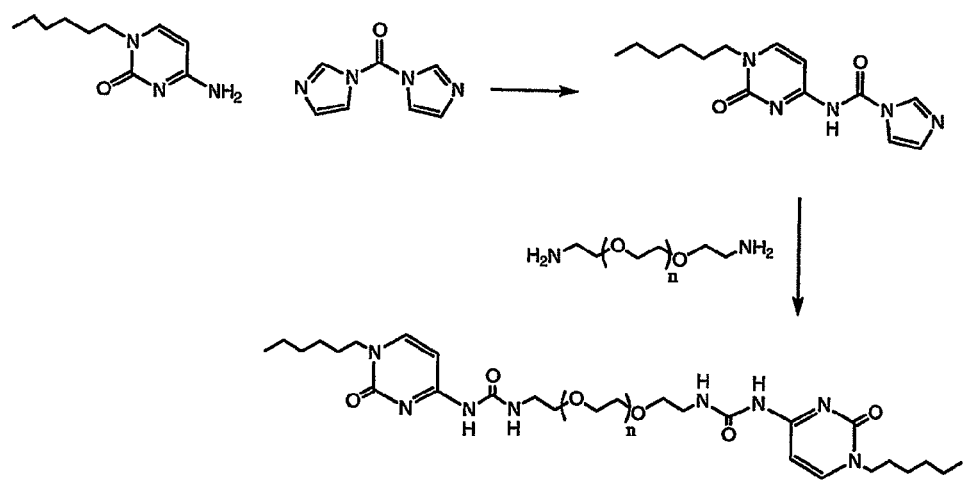
FIG. 6 shows a synthetic route for the preparation of a polymer of formula (II) according to the invention
Figure 7:
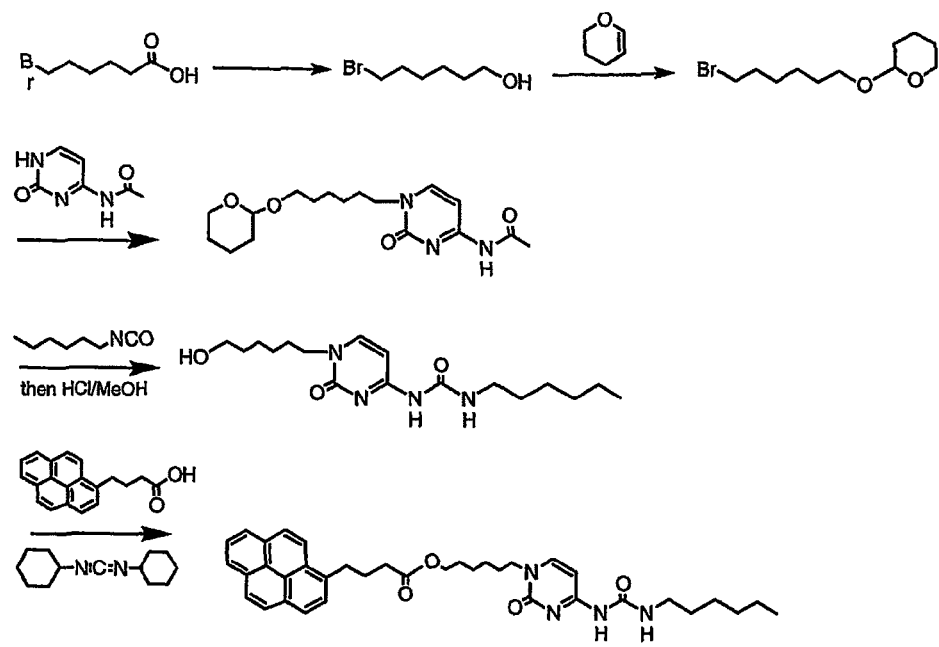
FIG. 7 shows the synthetic route for the preparation of cytosine module according to the invention, 4-Pyren-1-yl-butyric acid 6-[4-(3-hexyl-ureido)-2-oxo-2H-pyrimidin-1-yl]-hexyl ester, including a UV active group
Figure 8:
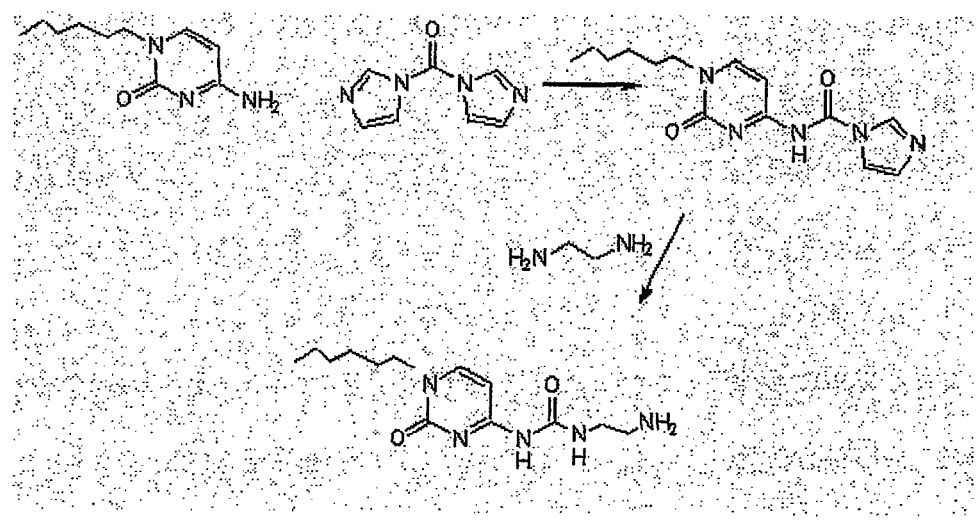
FIG. 8 shows the synthetic route for the preparation of cytosine module according to the invention, 1-(2-Amino-ethyl)-3-(1-hexyl-2-oxo-1,2-dihydro-pyrimidin-4-yl)-urea, including a functionalised end group

Unless otherwise noted, solvents and reagents were reagent grade from commercial suppliers and used without further purification. THF was dried by distillation from a sodium/benzophenone suspension under a dry $N_2$ atmosphere. $CH_2Cl_2$ was dried by distillation from $CaH_2$ under a dry $N_2$ atmosphere. Pyridine was dried by distillation over $CaH_2$ under a dry $N_2$ atmosphere. AU moisture-sensitive reactions were performed under a nitrogen atmosphere using oven-dried glassware. Reactions were monitored by TLC on Kieselgel 60 $F_{254}$ plates with detection by UV, or permanganate, ninhydrin (for ureas) and phosphomolybdic acid stains. Flash column chromatography was carried out using silica gel (particle size 40-63 μm). Melting points are uncorrected. $^1H$ NMR and $^{13}C$ NMR spectra were recorded in $CDCl_3$ and DMSO-$d_6$ solutions at the field indicated. Infrared spectra (IR) ($v_{max}$) were recorded on a Perkin Elmer 983 G or FT-IR 1605 spectrometer using potassium bromide discs or as thin films.

Example 1

Cytosine Module Synthesis

N-4-acetylcytosine (A): Cytosine (commercially available) (2.0 g, 1.8 mmol) was mixed with acetic anhydride (8.2 ml, 8.7 mmol) in pyridine (10 ml) and the solution was heated at 125° C. for 2.5 h. The solution was then cooled down to room temperature and EtOAc (15 ml) was added. The resulting mixture was stirred at room temperature for an additional 3 h and the solid was filtered off in vacuo. The white powder was washed thoroughly with EtOAc and dried in vacuo to afford (A) as a white solid (2.97 g, 93%).

mp>300° C. (EtOAC); $v_{max}$/cm$^1$ (KBr pellet) 3140 (N—H, s), 3130 (N—H, s), 3025 (C=C—H, s), 2969 (C—H, s), 2838 (C—H, s), 1722 (C=O, s), 1702 (C=O, s), 1610 (N—H amide, d), 1503, 1462 (C—H, d); $^1H$ NMR (400 MHz; DMSO-$d_6$) δ 11.49 (1H, s, NM, 10.75 (1H, s, NHCOCH$_3$), 7.80 (1H, d, J 7.0 Hz, CHCHNH), 7.08 (1H, d, J 7.0 Hz, CHNH), 2.23 (3H, s, CH$_3$); $^{13}C$ NMR (100 MHz; DMSO-$d_6$, 353 K) δ 170.1 (NHCOCH$_3$), 162.6 (C-4), 155.5 (NH-CONH), 146.3 (C-6), 94.1 (C-5), 23.7 (CH$_3$); m/z (ES−) 152.02 [(M−H$^+$), 100%]

N-(1-Hexyl-2-oxo-1,2-dihydro-pyrimidin-4-yl)-acetamide (B): To a solution of compound A (0.5 g, 3.2 mmol) in dry DMF (15 ml) was added portionwise anhydrous potassium carbonate (0.675 g, 4.9 mmol) followed with bromohexane (0.70 ml, 4.9 mmol). The solution was heated at 80° C. for 16 h. The residual solid was then filtered off and the filtrate evaporated under reduced pressure. The solid was then redissolved in CHCl$_3$ and washed with (1 N) HCl (10 ml) then water (10 ml) and finally with saturated sodium chloride solution (10 ml) and the organic phase was dried over MgSO$_4$. The solvents were evaporated in vacuo and the crude solid was purified over flash chromatography (CHCl$_3$/EtOAc, 5:1) to give compound (B) as a white solid (0.57 g, 75%).

Mp: 129-130° C. (chloroform); $v_{max}$ (KBr pellets) 3232 (N—H, s), 2950-2920 (C—H, s), 2848 (C—H, s), 1704 (C=O, s), 1660 (C=O, s) cm$^{-1}$; $^1H$ NMR (400 MHz; CDCl$_3$) δ 10.34 (1H, s, NH), 7.56 (1H, d, J 7.2 Hz, 5-H), 7.38 (1H, d, J 7.2 Hz, 6-H), 3.84 (2H, t, J 7.0 Hz, CH$_2$CH$_2$N), 2.33

(3H, s, COCH$_3$), 1.74 (2H, m, CH$_2$CH$_2$N), 1.32 (6H, m, 3×CH$_2$CH$_2$), 0.85 (3H, t, J 7.1 Hz, CH$_3$CH$_2$); $^{13}$C NMR (75 MHz; CDCl$_3$) δ 171.3 (COCH$_3$), 162.9 (C-4), 155.8 (C-2), 148.6 (C-6), 96.8 (C-5), 51.0 (CH$_2$N), 31.3 (CH$_3$CH$_2$CH$_2$), 29.0 (CH$_2$CH$_2$N), 26.1 (CH$_2$CH$_2$CH$_2$N), 24.8 (CH$_3$CO), 22.4 (CH$_3$CH$_2$), 13.9 (CH$_3$CH$_2$); m/z (ES+) 238 [(MH$^+$), 20%], 260 [(MNa$^+$), 50%], 497 [(2MNa$^+$), 100%]; HRMS calculated for C$_{12}$H$_{19}$N$_3$O$_2$ (MH$^+$) 238.1500. found 238.15544.

4-Amino-1-hexyl-1H-pyrimidin-2-one (C): N-(1-Hexyl-2-oxo-1,2 dihydropyrimidinyl)-acetamide (B) (0.100 g, 0.400 mmol) was dissolved in a 7 N solution of ammonia in MeOH (15 ml). The solution was stirred at room temperature in a sealed tube for 48 h. The solvents were removed under vacuo to afford a crude solid. Purification using flash silica chromatography (CHCl$_3$/MeOH, 7:1) afforded 4-Amino-1-hexyl-1H-pyrimidin-2-one (C) as a colourless solid (0.052 g, 63%).

Mp 216-217° C.; ν$_{max}$(KBr) 3350, 3105, 2930, 2856, 1664, 1620 cm$^{-1}$; $^1$H NMR (300 MHz; CDCl$_3$) δ 7.22 (1H, d, J 7.2 Hz, 5-H), 5.68 (1H, d, J 7.2 Hz, 6-H), 5.67 (2H, s broad, NH$_2$), 3.73 (2H, t, J 7.3 Hz, CH$_2$N), 1.68 (2H, m, CH$_2$CH$_2$N), 1.28 (6H, m, CH$_2$), 0.88 (3H, t, J 7.2 Hz, CH$_3$); $^{13}$C NMR (75 MHz; CDCl$_3$) δ 165.4 (C-4), 156.4 (C=O), 145.8 (C-6), 93.7 (C-5), 50.3 (CH$_2$), 31.4 (CH$_3$CH$_2$CH$_2$), 29.1 (CH$_2$CH$_2$N), 26.2 (CH$_2$CH$_2$CH$_2$N), 22.6 (CH$_3$CH$_2$), 14.0 (CH$_3$); m/z HRMS calculated for C$_{10}$H$_{18}$N$_3$O MH$^+$ 196.14444. found 196.14486; m/z (ES+) 413.5 (([2M+Na]$^+$, 85%], 391.5 ([2M+H]$^+$, 80), 218.2 (MNa$^+$, 95), 196.2 (MH$^+$, 100).

1-Hexyl-3-(1-hexyl-2-oxo-1,2-dihydro-pyrimidin-4-yl-urea (Rotamers 1 and 1') (D): To a solution of 4-amino-1-hexyl-1H-pyrimidin-2-one (C) (0.100 g, 0.513 mmol) in dry pyridine (5 ml) was added hexylisocyanate (0.110 ml, 0.769 mmol). The resulting yellow solution was heated at 90° C. for 16 h. The solution was then cooled to room temperature and the addition of hexane (5 ml) led to the precipitation of a white solid which was collected by filtration. The solid was purified using flash silica gel chromatography (CHCl$_3$/MeOH, 15:1) to give 1 as white needles (0.128 g, 78%).

Mp 210-211° C.; ν$_{max}$ (KBr) 3221, 3057, 2925, 2856, 1701, 1658, 1620, 1564 cm$^{-1}$; Rotamer 1: $^1$H NMR (500 MHz; 298 K in CDCl$_3$) δ 10.90 (1H, s, 7-H), 8.98 (1H, s, 9-H), 7.54 (1H, d broad, 5-H), 7.42 (1H, d, J 7.4 Hz, 6-H), 3.79 (2H, t, J 7.2 Hz, 16-H), 3.22 (2H, broad q, 10-H), 1.71 (2H, m, 17-H), 1.54 (2H, m, 11-H), 1.33 (2H, m, 18-H), 1.32 (2H, m, 12-H), 1.29 (12H, m, 13-H, 14-H, 19-H, 20-H), 0.87 (3H, m, 15-H), 0.85 (3H, m, 21-H); $^1$H NMR (500 MHz; 254.6 K in CDCl$_3$) (rotamer 1 (23:1)) 311.08 (1H, s, 7-H), 9.03 (1H, s, 9-H), 7.53 (1H, d broad, 5-H), 7.46 (1H, d, J 7.4 Hz, 6-H), 3.81 (2H, t, J 7.2 Hz, 16-H), 3.21 ((2H, broad q, 10-H), 1.70 (2H, m, 17-H), 1.28 (8H, m, 13-H, 14-H, 19-H, 20-H), 0.86 (3H, m, 15-H), 0.84 (3H, m, 21-H); (rotamer 1 (1:23)) δ 9.72 (1H, s, 9-H), 9.65 (1H, s, 7-H), 7.40 (1H, broad d, 6-H), 6.14 (1H, broad d, 5-H); $^{13}$C NMR (125 MHz; 298 K in CDCl$_3$) δ 164.9 (C-4), 157.2 (C-2), 154.3 (NHCONH), 146.6 (C-6), 97.2 (C-5), 50.7 (C-16), 40.1 (C-10), 31.53 (C-13), 31.3 (0-19), 29.3 (C-11), 28.9 (C-17), 26.6 (C-12), 26.10 (C-18), 22.6 (C-14), 22.4 (C-20), 14.0 (C-21), 13.9 (C-15); $^{13}$C CPMAS δ 165.7 (C-4), 157.4 (C-2), 155.1 (NHCONH), 150.1 (0-6), 96.3 (C-5), 49.3 (0-16), 40.8 (C-10), 34.1 (C-13, C-19), 32.3 (C-11), 31.8 (C-17), 29.5 (C-12, C-18), 24.7 (C-14), 24.2 (C-20), 15.0 (C-15, C-21); $^{15}$N CPMAS δ (relative to MeNO$_2$) −280.9 (N-9), −253.8 (N-7), −223.9 (N-3), −163.8 (N-1); Rotamer 1': $^1$H NMR (500 MHz; 333 K in DMSO-d$_6$) δ 9.55 (1H, s, 7-H), 8.81 (1H, s, 9-H), 7.85 (1H, d, 6-H), 6.22 (1H, d broad 5-H), 3.72 (2H, t, 16-H), 3.16 (2H, m, 10-H), 1.60 (2H, m, 17-H), 1.47 (2H, m, 11-H), 1.31 (4H, m, 12-H, 18-H), 1.29 (4H, m, 13-H, 14-H), 1.27 (4H, m, 19-H, 20-H), 0.86 (6H, m, 15-H, 21-H); $^{13}$C NMR (125 MHz; 298 K in DMSO-d$_6$) δ 162.1 (C-4), 153.8 (NHCONH), 153.3 (C-2), 147.9 (C-6), 93.8 (C-5), 48.9 (C-16), 38.8 (C-10), 30.5 (C-13), 30.4 (C-19), 28.9 (C-11), 27.9 (C-17), 25.6 (C-12), 25.1 (C-18), 21.6 (C-14), 21.5 (C-20), 13.4 (C-21), 13.3 (C-15); m/z HRMS calculated for C$_{17}$H$_{30}$O$_2$N$_4$ M$^+$323.24469. found 323.24362; m/z (ES+) 323 (MH$^+$, 100%), 280 (M$^+$-C$_3$H$_7$, 55%).

Example 2

Polymer Synthesis

Polymer E: To a solution of 4-amino-1-hexyl-1H-pyrimidin-2-one (C) (0.100 g, 0.513 mmol) in dry CH$_2$Cl$_2$ (7 ml) was added N,N carbonyl diimidazole (0.131 g, 0.513 mmol) and the solution was stirred at room temperature for 16 h. The solvent was evaporated and the residue redissolved in dry chloroform. Hexane was then added to precipitate the intermediate, which was dried in vacuo and used directly without further purification. PEG terminated anine (0.077 g, 0.0228 mmol; 3400 g mol$^{-1}$) was dissolved in dry THF (5 ml) and the imidazole intermediate (0.033 g, 0.114 mmol) was added. The solution was heated at reflux for 16 h. The solvent was then evaporated and the residue redissolved in chloroform. The organic phase was washed with water (5 ml), and saturated sodium chloride solution (5 ml). The organic phase was dried over MgSO$_4$ and the solvent evaporated under vacuo to give E (0.052 g, 60%).

Mp 46° C.; ν$_{max}$ (KBr) 3230, 3010, 2880, 1721, 1651, 1620, 1568, 1504 cm$^{-1}$; $^1$H NMR (500 MHz; CDCl$_3$) δ 10.73 (1H, s, NHCONHCH$_2$), 9.15 (1H, s, NHCONHCH$_2$), 7.42 (1H, d, J 7.3 Hz, 6-H), 3.78 (2H, t, J 7.4 Hz, CH$_2$N), 3.63 (150H, m, CH$_2$CHO), 1.70 (2H, m, CH$_2$CH$_2$N), 1.30 (6H, m, CH$_2$CH$_2$), 0.87 (3H, t, J 7.0 Hz, CH$_3$); $^{13}$C NMR (125 MHz; CDCl$_3$) δ 153.4 (NHCONH), 146.7 (C-6), 96.6 (C-5), 70.4 (CH$_2$O), 70.2 (CH$_2$O), 69.6 (0H$_2$O), 50.7 (CH$_2$N), 40.5 (NH-CONHCH$_2$), 31.2 (CH$_2$), 29.6 (CH$_2$), 28.8 (CH$_2$), 26.1 (CH$_2$), 22.4 (CH$_2$O), 13.9 (CH$_3$).

Example 3

Synthesis of Cytosine Module of Formula (I) Incorporating a UV Active Group

6-Bromo-hexan-1-ol (F): To a solution of borane sulfide (commercially available) (2 N in THF, 1.6 ml, 3.3 mmol) was added at 0° C. a solution of 6-bromohexanoic acid (0.5 g, 2.5 mmol) in THF (5 ml). The solution was stirred at room temperature for 16 h. The solution was quenched by addition of EtOH (10 ml) followed by water (10 ml). The solution was then extracted with CH$_2$Cl$_2$ (3×10 ml) and the combined organic phases were dried (MgSO$_4$). The solvent was evaporated in vacuo and the crude material was then purified through flash chromatography column (hexane/EtOAc, 8:1) to afford 6-Bromo-hexan-1-ol (F) as an oil (0.36 g, 80%).

ν$_{max}$ (KBr film) 3300 (O—H, s), 2922-2850 (C—H, s), 1460 (C—H, d), 561 (C—Br, s) cm$^1$; $^1$H NMR (300 MHz; CDCl$_3$) δ 3.60 (2H, t, J 6.5 Hz, CH$_2$OH), 3.39 (2H, t, J 6.8 Hz, CH$_2$Br), 1.85 (2H, m, CH$_2$CH$_2$OH), 1.65 (1H, s, OH), 1.56 (2H, m, CH$_2$CH$_2$Br), 1.41 (4H, m, CH$_2$H$_2$); $^{13}$C NMR (75 MHz; CDCl$_3$) δ 62.7 (CH$_2$OH), 33.8 (CH$_2$Br), 32.7 (CH$_2$CH$_2$OH), 32.5 (CH$_2$CH$_2$Br), 27.9 (CH$_2$CH$_2$CH$_2$Br), 24.9 (CH$_2$CH$_2$CH$_2$OH); HMRS calculated for C$_6$H$_{14}$OBr (MH$^+$) 181.02280. found 181.02316.

2-(6-Bromo-hexyloxy)-tetrahydropyran (G): To a solution of 6-bromo hexan-ol (F) (2 g, 11 mmol) in CH$_2$Cl$_2$ (50 ml) was added dropwise dihyrdopyran (1.6 ml, 16.5 mmol) followed by para-toluenesulphonic acid (commercially available) (0.075 g). The reaction mixture was stirred at room temperature for 16 h. The dark blue solution was then washed with water (2×25 ml) then saturated hydrogen carbonate solution (25 ml) and finally with a saturated sodium chloride solution (25 ml). The organic phase was then dried (MgSO$_4$) and the solvent was evaporated under reduced pressure. The crude material was then purified through flash silica gel chromatography (hexane/EtOAc, 10:1) to afford compound 2-(6-Bromo-hexyloxy)-tetrahydropyran (G) as an oil (0.5 g, 70%).

$v_{max}$ (KBr film) 2937-2864 (C—H, s), 1136 (C—O, s), 1118 (C—O, s) cm$^{-1}$; $^1$H NMR (300 MHz; CDCl$_3$) δ 4.52 (1H, dd, J 4.3 Hz, OCHO), 3.81 (1H, ddd, CHHOCH), 3.67 (1H, dt, CHHOTHP), 3.41 (1H, ddd, CHHOCH), 3.36 (3H, m, CHHOTHP, CH$_2$Br), 1.82 (2H, m, CH$_2$CH$_2$Br), 1.36-1.56 (12H, m, CH$_2$CH$_2$CH$_2$); $^{13}$C NMR (75 MHz; CDCl$_3$) δ 98.8 (OCHO), 67.3 (CH$_2$OTHP), 62.5 (CH$_2$OCH), 34.6 (CH$_2$Br), 33.8 (CH$_2$CH$_2$Br), 31.5 (CH$_2$CHO), 30.7, 29.5, 27.9, 25.4, 20.7; m/z (ES+) 287.08 [(MNa$^+$), 100%]; HMRS calculated for C$_{11}$H$_{21}$O$_2$Br (MNa$^+$) 287.06171. found 287.06140.

N-{2-Oxo-1-[6-(tetrahydro-pyran-2-yloxy)-hexyl]-1,2-dihydro-pyrimidin-4-yl}-acetamide (H); To a suspension of (G) (0.56 g, 3.00 mmol) in DMF (40 ml) was added anhydrous potassium carbonate (0.62 g, 4.50 mmol). The mixture was stirred at room temperature for 30 min and compound 2-(6-Bromo-hexyloxy)-tetrahydropyran (1.2 g, 4.5 mol) was added. The solution was then heated at 80° C. for 48 h. The solution was cooled down, the residue was filtered off and the filtrate was concentrated in vacuo. The residue was redissolved in chloroform (50 ml) and washed with water (2×30 ml), then saturated sodium chloride solution (2×30 ml). The solution was dried (MgSO4) and the solvent was evaporated under reduced pressure. The crude material was then purified through flash silica gel chromatography (CHCl$_3$/MeOH, 10:1) to afford compound N-{2-Oxo-1-[6-(tetrahydro-pyran-2-yloxy)-hexyl]-1,2-dihydro-pyrimidin-4-yl}-acetamide H as a yellow oil (0.690 g, 68%).

$v_{max}$ (KBr film) 3014 (C=C—H, s), 2862 (C—H, s), 1712 (C=O, s), 1660 (C=O, s) cm$^{-1}$; $^1$H NMR (300 MHz; CDCl$_3$) δ 10.57 (1H, s, NH), 7.56 (1H, d, J 7.3 Hz, 5-H), 7.36 (1H, d, J 7.2 Hz, 6-H), 4.50 (1H, m, OCHO), 3.82 (3H, m, CHHOCH, CH$_2$N), 3.63 (1H, m, CHH$_2$OTHP), 3.40 (1H, m, CHHOCH), 3.30 (1H, m, CHHOTHP), 2.20 (3H, s, CH$_3$), 1.70 (4H, m, CH$_2$CH$_2$N, CH$_2$ (THP)), 1.50-1.30 (10H, m, CH$_2$CH$_2$); $^{13}$C NMR (75 MHz; CDCl$_3$) δ 171.56 (COCH$_3$), 163.04 (C-4), 155.82 (C-2), 148.6 (C-6), 98.8 (OCHO), 96.9 (C-5), 67.28 (CH$_2$OTHP), 62.41 (CH$_2$OCHO), 50.91 (CH$_2$N), 30.74 (CH$_2$CHO), 29.50, 28.84, 26.29, 25.83, 25.42, 24.76, 19.70 (CH$_3$); M/z (ES+) 360.28 [(MNa$^+$), 100%], 697.69 [(2MNa$^+$), 20%]; HRMS calculated for C$_{17}$H$_{28}$N$_3$O$_4$ (MNa$^+$) 360.18938. found 360.18940.

4-Amino-1-[6-(tetrahydro-pyran-2-yloxy)-hexyl]-1H-pyrimidin-2-one (I): N-{2-Oxo-1-[6-(tetrahydro-pyran-2-yloxy)-hexyl]-1,2-dihydro-pyrimidin-4-yl}-acetamide (H) (0.44 g, 1.3 mmol) was dissolved in a solution of ammonia in MeOH (7 N) (50 ml). The mixture was stirred at room temperature for 16 h. After completion of the reaction the solvent was evaporated under reduced pressure and the crude material was purified over flash silica gel chromatography (CHCl$_3$/MeOH, 10:1) to give compound 4-Amino-1-[6-(tetrahydro-pyran-2-yloxy)-hexyl]-1H-pyrimidin-2-one (I) as a semi-solid (0.25 g, 65%).

$v_{max}$ (KBr film) 3480 (N—H, primary amine, s), 3400 (N—H, primary amine, s), 2950 (C—H, s) 2860 (C—H, s), 1651 (C=O, s) cm$^{-1}$; $^1$H NMR (400 MHz; CDCl$_3$) δ 7.14 (1H, d, J 7.2 Hz, 6-H), 5.76 (1H, d, J 7.2 Hz, 5-H), 4.51 (1H, m, OCHHO), 3.80 (1H, m, CHHOCH), 3.68 (3H, m, CHHOTHP, CH$_2$N), 3.41 (1H, m, CHHOCH), 3.33 (1H, m, CHHOTHP), 1.29-1.66 (14H, m, CH$_2$CH$_2$CH$_2$); $^{13}$C NMR (125 MHz; CDCl$_3$) δ 166.0 (C-4), 156.8 (C-2), 145.1 (C-6), 98.8 (CH), 94.5 (C-5), 67.3 (CH$_2$OTHP), 62.4 (CH$_2$OCH), 50.3 (CH$_2$N), 30.6 (CH$_2$CHO), 29.4, 29.0, 26.3, 25.8, 25.3, 19.6; m/z (ES+) 296.21 [(MH$^+$), 20%], 318.21 [MNa$^+$), 100%], 591.49 [(2 MH$^+$), 60%]; HRMS calculated for C$_{15}$H$_{26}$N$_3$O$_3$ (MNa$^+$) 360.17881. found 360.17997.

1-Hexyl-3-[1-(6-hydroxy-hexyl)-2-oxo-1,2-dihydro-pyrimidin-4-yl)-urea) (J): To a solution of 4-Amino-1-[6-(tetrahydro-pyran-2-yloxy)-hexyl]-1H-pyrimidin-2-one (I) as a semi-solid (0.50 g, 1.70 mmol) in dry pyridine (6 ml) was added dropwise hexylisoycyanate (0.32 g, 2.5 mmol). The solution was heated at 90° C. for 16 h. The solvent was then evaporated in vacuo. The crude solid was redissolved in CHCl$_3$ (10 ml), washed with water (5 ml) then saturated sodium chloride solution (5 ml) and dried (MgSO$_4$). The solvent was evaporated under reduced pressure to afford a crude solid (0.50 g). The solid was dissolved in a mixture of MeOH (15 ml), THF (3 ml) and conc. HCl (3 ml). The solution was stirred at room temperature for 16 h and the solvents were evaporated in vacuo. The residue was purified through flash silica gel chromatography (CHCl$_3$/MeOH, 9:1) to afford compound 1-Hexyl-3-[1-(6-hydroxy-hexyl)-2-oxo-1,2-dihydro-pyrimidinyl]-urea) (3) (0.170 g, 30%).

mp: 166° C. (methanol); $v_{max}$ (KBr pellet) 3219 (O—H, s), 3055 (C=C—H, s), 2929 (C—H, s), 2856 (C—H, s), 1701 (C=O, s), 1654 (C=O, s), 1622 (C=C, s), 1430 (O—H, d), 1053 (C—O s, OH) cm$^{-1}$; $^1$H NMR (400 MHz; CDCl$_3$) δ 10.91 (1H, s, 7-H), 8.94 (1H, s, 9-H), 7.54 (1H, d broad, 6-H), 7.42 (1H, d, J 7.4 Hz, 6-H), 3.81 (2H, t, J 7.2 Hz, CH$_2$N), 3.62 (2H, t, J 6.4 Hz, CH$_2$OH), 3.23 (2H, broad q, CH$_2$NHCONH), 1.74 (2H, m, CH$_2$CH$_2$N), 1.55 (4H, m, CH$_2$CH$_2$NHCONH, CH$_2$CH$_2$OH), 1.41-1.28 (12H, m, CH$_2$CH$_2$), 0.86 (3H, t, J 6.6 Hz, CH$_3$); m/z (ES+) 362.46 [(MH$^+$) 100%]; HRMS calculated for C$_{17}$H$_{30}$N$_4$O$_3$ (MH$^+$) 361.22101. found 361.22137.

4-Pyren-1-yl-butyric acid 6-[4-(3-hexyl-ureido)-2-oxo-2H-pyrimidin-1-yl]-hexyl ester (K): To a solution of pyrene butyric acid (commercially available) (0.05 g, 0.17 mmol) in CH$_2$Cl$_2$ (5 ml) was added at 0° C., dicyclohexylcarboimide (0.044 g, 0.210 mmol) and dimethylaminopyridine (4 mg). The mixture was stirred for 1 h. 1-Hexyl-3-[1-(6-hydroxy-hexyl)-2-oxo-1,2-dihydro-pyrimidinyl]-urea) (J) was then added to the mixture and the solution was stirred at room temperature for 16 h. The solid was filtered off and the filtrate washed with water (2×10 ml) then saturated sodium chloride solution (5 ml). The organic phase was then dried (MgSO$_4$) and the solvent evaporated in vacuo. The crude solid was purified using flash silica gel chromatography using a gradient: 1) (CHCl$_3$) 2) (CHCl$_3$/EtOAc, 5:1) and 3) (CHCl$_3$/EtOAc/Et$_3$N, 5:1:0.2). 4-Pyren-1-yl-butyric acid 6-[4-(3-hexyl-ureido)-2-oxo-2H-pyrimidin-1-yl]-hexyl ester (K) was obtained as a yellow solid (0.025 mg, 23%).

mp: 114-115° C. (chloroform); $v_{max}$ (KBr pellet) 3212 (N—H, s), 3047 (C=C—H, s), 2927 (C—H, s), 2857 (C—H, s), 1736 (C=O, s), 1702 (C=O, s), 1659 (C=O, s), 1620 (C=C, d) cm$^{-1}$; $^1$H NMR (400 MHz; CDCl$_3$) δ 10.87 (1H, s, 7-H), 8.97 (1H, s, 9-H), 8.28-7.82 (10H, m, Pyrene-H), 7.50 (1H, broad d, 5-H), 7.27 (1H, d, J 7.2 Hz, 6-H), 4.05 (2H, t, J 6.6 Hz, CH$_2$OCO), 3.70 (2H, t, J 7.2 Hz, CH$_2$N), 3.38 (2H, t, J 7.6 Hz, CH$_2$-pyrene), 3.23 (2H, m, CH$_2$NHCONH), 2.44 (2H, t, J 7.4 Hz, CH$_2$COO), 2.18 (2H, t, J 7.6 Hz, CH$_2$CH$_2$COO), 1.66-1.55 (6H, m, CH$_2$CH$_2$OCO, CH$_2$N, CH$_2$NHCONH), 1.32-1.27 (10H, m, CH$_2$CH$_2$), 0.85 (3H, t, J 6.7 Hz, CH$_3$); $^{13}$C NMR (100 MHz; CDCl$_3$) δ 173.5 (COO), 165.0 (C-4), 154 (NHCONH), 146.4 (C-6), 135.6 (C-33), 131.3, 130.7, 129.9, 128.6, 127.4, 127.3, 127.2, 126.6, 125.8, 125.0, 124.0, 124.8, 124.7, 124.6, 123.2, 98.9 (C-5), 64.1 (COOCH$_2$), 50.4 (CH$_2$N), 40.0 (CH$_2$NHCONH), 33.8 (CH$_2$—Ar), 32.6 (CH$_2$COO), 31.5 (NHCONHCH$_2$CH$_2$CH$_2$), 29.3 (CH$_2$CH$_2$N), 28.7 (CH$_2$), 28.3 (CH$_2$), 26.7 (CH$_2$), 26.6 (CH$_2$), 26.0 (CH$_2$CH$_2$CH$_2$N), 25.5 (CH$_2$), 22.5 (CH$_2$), 14.0 (CH$_3$); HRMS calculated for C$_{37}$H$_{44}$O$_4$N$_4$ (MH$^+$) 631.32548. found 631.32640.

Preparation of Cytosine Module with Functionalised End Groups

Example 4

1-(2-Amino-ethyl)-3-(1-hexyl-2-oxo-1,2-dihydro-pyrimidin-4-yl)-urea (L)

To a solution of 4-amino-1-hexyl-1H-pyrimidin-2-one (C) (0.10 g, 0.513 mmol) in dry CH$_2$Cl$_2$ (7 ml) was added N,N carbonyl diimidazole (0.131 g, 0.513 mmol) and the solution was stirred at room temperature for 16 h. The solvent was evaporated and the residue redissolved in dry chloroform Hexane was then added to precipitate the intermediate, which was dried in vacuo and used directly without further purification. To a solution of the resulting imidazole intermediate (0.100 g, 0.346 mmol) was added to a solution of ethyldiamine (0.14 ml, 2.07 mmol) in dry THF (5 ml). The solution was stirred at room temperature for 16 h under N$_2$ atmosphere. The solvents were then evaporated and the residue was dissolved in chloroform and washed with water and brine. The organic phases were combined and dried over MgSO$_4$. The solvent was evaporated in vacuo and the crude compound was purified through flash silica gel chromatography (CHCl$_3$/MeOH/Et$_3$N (1:2:0.1)) to afford pure compound (L) (0.080 g, 82%)

$^1$H NMR (400 MHz, CDCl$_3$) δ 10.83 (1H, s, 7-H), 9.2 (1H, s, 9-H), 7.54 (1H, s, 5-H), 7.42 (1H, d, J 7.4 Hz, 6-H), 3.79 (2H, t, J 7.2 Hz, CH$_2$N), 3.30 (2H, q, J 5.5 Hz, NHCH$_2$), 2.85 (2H, t, J 5.6 Hz, CH$_2$NH$_2$), 1.69 (4H, broad, CH$_2$CH$_2$N, NH$_2$), 1.27 (6H, m, CH$_2$), 0.85 (3H, t, J 6.4 Hz, CH$_3$). $^{13}$C NMR (100 MHz, CDCl$_3$) δ 164.8 (C-4), 157.3 (C-2), 154.6 (C-8), 146.8 (C-6), 98.0 (C-5), 50.8 (CH$_2$N), 43.8 (CH$_2$NH$_2$), 41.8 (CH$_2$NH), 31.3 (CH$_2$), 28.9 (CH$_2$), 26.1 (CH$_2$), 22.4 (CH$_2$), 13.9 (CH$_3$).

Example 5

1-Allyl-3-(1-hexyl-2-oxo-1,2-dihydro-pyrimidin-4-yl)-urea (M): To a solution of 4-amino-1-hexyl-1H-pyrimidin-2-one (C) (1.00 g, 5.13 mmol) in dry CH$_2$Cl$_2$ (7 ml) was added N,N carbonyl diimidazole (1.31 g, 5.13 mmol) and the solution was stirred at room temperature for 16 h. The solvent was evaporated and the residue redissolved in dry chloroform. Hexane was then added to precipitate the intermediate, which was dried in vacuo and used directly without further purification. To a solution of the resulting imidazole intermediate (1.0 g, 3.47 mmol) in dry THF (20 ml) was added allyl amine (0.40 ml, 5.33 mmol). The solution was stirred at room temperature for 16 h. the solvent was evaporated in vacuo and the residue was redissolved in chloroform and washed with water and brine. The organic phase was combined and dried over MgSO$_4$ and the solvent evaporated under vacuo to afford crude G, which was purified via flash silica gel chromatography (CHCl$_3$/MeOH, 7:1) to give pure compound M (0.262 g, 30% from the amine)

$^1$H NMR (400 MHz, CDCl$_3$) δ 10.95 (1H, s, H-7), 9.14 (1H, s, H-9), 7.50 (1H, broad s, H-5), 7.42 (1H, d, J 7.32 Hz, H-6), 5.85 (1H, m, CH$_2$CH—CH$_2$), 5.10 (2H, dd, CH=CH, 3.84 (2H, m, NHCH$_2$), 3.77 (2H, t, J 7.32 Hz, CH$_2$N), 1.65 (2H, m, CH$_2$CH$_2$N), 1.26 (6H, m, CH$_2$), 0.85 (3H, t, J 7.6 Hz, CH$_3$) $^{13}$C NMR (100 MHz, CDCl$_3$) δ 164.7 (C-4), 157.1 (C-2), 154.3 (C-8), 146.8 (C-6), 134.6 (CH=CH$_2$), 115.4 (CH=CH$_2$) 97.1 (C-5), 50.7 (CH$_2$N), 42.3 (CH$_2$NH), 31.2 (CH$_2$), 28.7 (CH$_2$), 25.9 (CH$_2$), 22.3 (CH$_2$), 13.8 (CH$_3$).

Example 6

(1-(1-Hexyl-2-oxo-1,2-dihydro-pyrimidin-4-yl)-3-(6-isocyanato-hexyl)-urea (N): To a solution of 4-Amino-1-hexyl-1H-pyrimidin-2-one (C) (0.100 g, 0.51 mmol) in DCM (8 ml) was added dropwise hexyldiisocyanate (0.5 ml, 3.1 mol). The solution was stirred at room temperature for 16 h. Hexane was then added giving a white precipitate. The solid was then filtered off and dried carefully in vacuo to afford compound N (40% yield).

$^1$H NMR (400 MHz, CDCl$_3$) δ 10.9 (1H, s, H-7), 9.03 (1H, s, 9-H), 7.51 (1H, s, 5-H), 7.42 (1H, s, 6-H), 3.79 (2H, t, CH$_2$N), 3.22 (4H, m, CH$_2$NHCONH, CH$_2$NCO), 1.68 (2H, m, CH$_2$), 1.56 (4H, m, CH$_2$), 1.28 (10H, m, CH$_2$), 0.85 (3H, m, CH$_3$). $^{13}$C NMR (100 MHz, CDCl$_3$) δ 164.7 (C-4), 157.1 (C-2), 154.3 (C-8), 146.7 (C-6), 121.7 (NCO), 97.2 (C-5), 50.6 (CH$_2$N), 42.8 (CH$_2$NH), 39.7 (CH$_2$NCO), 31.2 (CH$_2$), 31.1 (CH$_2$), 29.1 (CH$_2$), 28.7 (CH$_2$), 26.1 (CH$_2$), 26.0 (CH$_2$), 13.8 (CH$_3$). m/z 364 (MH+), 396 (M+CH$_3$O), 728.8 (2M+H).

Supramolecular Polymer Synthesis

Example 7

Polymer E': PEG terminated amine (0.077 g, 0.0228 mmol; 3400 g mol$^{-1}$) was dissolved in dry chloroform (5 ml) and compound N (0.04 g, 0.114 mmol) in dry chloroform (5 ml) was added (0.110 ml, 0.769 mmol) and tin dibutyl dilaurate (1 mol %, 0.0114 mmol). The resulting yellow solution was heated to reflux temperature for 16 h The solvent was then evaporated and the residue redissolved in chloroform. The organic phase was washed with water (5 ml), and saturated sodium chloride solution (5 ml). The organic phase was dried over MgSO$_4$ and the solvent evaporated under vacuo to give polymer E' (0.040 g, 50%).

Mp 56° C.; ν$_{max}$ (KBr) 3230, 3010, 2880, 1721, 1651, 1620, 1568, 1504 cm$^{-1}$; $^1$H NMR (500 MHz; CDCl$_3$) δ 10.73 (1H, s, NHCONHCH$_2$), 9.15 (1H, s, NHCONHCH$_2$), 7.42 (1H, d, J 7.3 Hz, 6-H), 3.78 (2H, t, J 7.4 Hz, CH$_2$N), 3.63 (150H, m, CH$_2$CH$_2$O), 1.70 (2H, m, CH$_2$CH$_2$N), 1.30 (6H, m, CH$_2$CH$_2$), 1.28 (10H, m, CH$_2$), 0.87 (3H, t, J 7.0 Hz, CH$_3$); $^{13}$C NMR (125 MHz; CDCl$_3$) δ 153.4 (NHCONH), 146.7, 96.6, 70.4, 70.2, 69.6, 50.7 (CH$_2$N), 40.5 (NHCONHCH$_2$), 31.2, 29.6, 28.8, 26.1, 22.4, 13.9.

The SP compounds exemplified below are listed in table 2, the polymers P, used in their synthesis are listed in table 1.

TABLE 1

Table showing polymers incorporated into compound of the formula (II)

| Polymer reference | POLYMER |
|---|---|
| Pi | Poly (tetrahydrofuran carbonate) diol<br>OH—(OCH$_2$CH$_2$CH$_2$CH$_2$)$_3$[OCO(OCH$_2$CH$_2$CH$_2$)$_3$]$_7$)—OH |
| Pii | Poly (2-methyl-1,3-propylene adipate) diol term<br>OH—[OCH$_2$CH(CH$_3$)CH$_2$O$_2$C(CH$_2$)$_4$CO]$_n$—OCH$_2$CH(CH$_3$)CH$_2$OH |
| Piii | Tegomer 2311<br>HO—(CH$_2$)$_m$—[Si(CH$_3$)$_2$$^o$]$_n$—Si(CH$_3$)$_2$—(CH$_2$)$_m$—OH |
| Piv | Poly(ethylene-co-1,2-butylene)diol<br>HO(—CH$_2$CH$_2$—)$_x$[—CH$_2$CH(C$_2$H$_5$)—]$_y$OH |
| Pv | PEG—OH<br>OH—(CH$_2$CH$_2$O)$_n$—(CH$_2$CH(CH$_3$)O)$_m$—(CH$_2$CH$_2$O)$_l$—CH$_2$CH$_2$OH |
| Pvi | PolyGLYN |
| Pvii | Poly NIMMO |
| Pviii | Diol (PEG 6) OH (CH$_2$CH$_2$O)$_5$CH$_2$CH$_2$OH |
| Pix | HTPB (HOH$_2$CCH=CHCH$_2$OH) |
| Px | Poly(ethylene glycol) bis(3-aminopropyl) terminated<br>H$_2$NCH$_2$CH$_2$CH$_2$(OCH$_2$CH$_2$)$_n$OCH$_2$CH$_2$CH$_2$NH$_2$ n~34 |
| Pxi | Poly(propylene glycol)-block-poly(ethylene glycol)-block-poly(propylene glycol)bis(2-aminopropyl ether)<br>CH$_3$CH(NH$_2$)CH$_2$[OCH(CH$_3$)CH$_2$]$_l$(OCH$_2$CH$_2$)$_m$[OCH$_2$CH(CH$_3$)]$_n$NH$_2$ |
| Pxii | Poly(dimethylsiloxane), bis(3-aminopropyl) terminated<br>H$_2$N(CH$_2$)$_3$Si(CH$_3$)$_2$O[—Si(CH$_3$)$_2$O—]$_n$Si(CH$_3$)$_2$(CH$_2$)$_3$NH$_2$ n~30 |
| Pxiii | PEG—NH$_2$<br>H$_2$NCH$_2$CH$_2$—(OCH$_2$CH$_2$)$_n$—OCH$_2$CH$_2$NH$_n$ n~75 |

TABLE 2

Table showing structures of compounds of the formula (II) having the polymers referenced in table 1 incorporated:

| Supramolecular Polymer Structure | POLYMER INCORPORATED | COMPOUNDS |
|---|---|---|
| (structure 1) | Pi<br>Pii<br>Piii<br>Piv<br>Pv<br>Pvi<br>Pvii<br>Pviii<br>Pix | SP7<br>SP9<br>SP11<br>SP13<br>SP15<br>SP41<br>SP43<br>SP45<br>SP47 |
| (structure 2) | Px<br>Pxi<br>Pxii<br>Pxiii | SP29<br>SP31<br>SP33<br>SP35 |
| (structure 3) | Px<br>Pxi<br>Pxii<br>Pxiii | SP21<br>SP23<br>SP25<br>SP27 |

TABLE 2-continued

Table showing structures of compounds of the formula (II) having the polymers referenced in table 1 incorporated:

| Supramolecular Polymer Structure | POLYMER INCORPORATED | COMPOUNDS |
|---|---|---|
| (structure shown) | Px | SP37 |
| | Pxi | SP38 |
| | Pxii | SP39 |
| | Pxiii | SP40 |

Example 8

Synthesis of Mono Urea Polymers Using Polymers OH Terminated and Cytosine Unit: SP7, SP9, SP11, SP13, SP15

To a solution of each of Pi, Pii, Piii, Piv, Pv (0.495 g, 0.25 mmol) in dry chloroform (10 ml), was added compound (1-(1-Hexyl-2-oxo-1,2-dihydro-pyrimidin-4-yl)-3-(6-isocyanato-hexyl)-urea (N) (0.280 mg, 0.74 mmol) with the addition of one drop of dibutyltindilaurate, and the reaction mixture was heated at reflux temperature for 20 h. Chloroform (10 ml) was then added and the mixture was filtered off in vacuo to remove the excess of isocyanate. The filtrate was concentrated down to 10 ml, and silica gel (200 mg) was added with a further drop of dibutyltindilaurate. The solution was heated at 60° C. for 2 h. The silica gel was then removed by filtration and the chloroform was evaporated in vacuo to give compounds SP7, SP9, SP11, SP13, SP15 respectively. Purification over flash chromatography was required for some polymers ($CHCl_3$/MeOH 20:1 to 10:1).

Compound SP7

No purification required via flash silica chromatography: Waxy white solid $^1$H NMR (400 MHz; $CDCl_3$) δ 10.85 (21, broad s, 7-H), 9.00 (2H, broad s, 9-H), 7.52 (2H, broad s, 5-H), 7.41 (2H, d, J 7.2 Hz, 6-H), 4.83 (2H, s, NHCOO), 4.11 (36H, t, J 6.5 Hz, $OCOCH_2$), 4.03 (4H, t broad, $CH_2OCONH$), 3.78 (4H, t, J 7.3 Hz, $CH_2N$), 3.43 (80H, m, $OCH_2$), 3.24 (4H, m, $NHCONHCH_2$), 3.12 (4H, m, $CH_2NHCOO$), 1.73-1.62 (140H, m, $OCH_2CH_2CH_2$), 1.36-1.22 (64H, m, $CH_2$), 0.86 (6H, m, $CH_3$);

$^{13}$C NMR (125 MHz; $CDCl_3$) δ 164.8 (C-4), 157.2 (C-2), 156.6 (NHCOO), 155.3 (OCOO), 154.4 (NHCONH), 146.4 (C-6), 97.3 (C-5), 70.6 ($CH_2O$), 70.0 ($CH_2$), 67.7 ($CH_2O$), 67.1 ($NHCOOCH_2CH_2O$), 50.7 ($CH_2N$), 40.8 ($CH_2NHCOO$), 39.8 ($NHCONHCH_2$), 34.0 ($CH_2$), 31.3 ($CH_2$), 29.5 ($CH_2$), 29.2 ($CH_2$), 28.8 ($CH_2$), 26.4 ($CH_2$), 25.9 ($CH_2$), 25.5 ($CH_2$), 25.1 ($CH_2$), 24.9 ($CH_2$), 22.6 ($CH_2$), 22.4 ($CH_2$), 13.9 ($CH_3$)

Compound SP9

No purification required via flash silica chromatography: Waxy white solid

1H NMR (400 MHz; $CDCl_3$) δ 10.89 (2H, broad s, 7-H), 8.98 (2H, broad s, 9-H), 7.50 (2H, broad s, 5-H), 7.42 (2H, d, J 7.2 Hz, 6-H), 4.80 (2H, broad s, NHCOO), 3.95 (38H, m, $CH_2OOC$, $CH_2OCONH$), 3.81 (4H, t, J 7.2 Hz, $CH_2N$), 3.20 (4H, broad q, $NHCONHCH_2$), 3.10 (4H, broad q, $CH_2NHCOO$), 2.32 (36H, m, $CH_2COO$), 2.07 (10H, m, $CHCH_3$), 1.64-1.27 (68H, m, $NHCH_2CH_2$, $OCH_2CH_2$, $CH_2$), 0.95 (30H, d, J 6.9 Hz, $CH_3$), 0.84 (6H, t, $CH_2CH_3$);

$^{13}$C NMR (100 MHz; $CDCl_3$) δ 173.1 ($CH_2COO$), 164.7 (C-4), 157.1 (NHCOO), 156.1 (C-2), 154.3 (NHCONH), 146.7 (C-6), 97.2 (C-5), 65.8 ($CH_2OCONH$), 65.6 ($CH_2OOC$), 50.6 ($CH_2N$), 40.7 ($CH_2NHCOO$), 39.7 ($NHCONHCH_2$), 33.6 ($CH_2$), 31.2 ($CH_2$), 29.5 (CH), 29.3 ($CH_2$), 26.4 (CH), 24.2 ($CH_2$), 22.5 ($CH_2CH_3$), 13.8 ($CH_3$);

Compound SP11

Purified via flash silica chromatography: Brittle opaque white solid $^1$H NMR (300 MHz; $CDCl_3$) δ 10.91 (2H, broad s, 7-H), 9.02 (2H, broad s, 9-H), 7.54 (21H, broad s, 5-H), 7.43 (2H, d, J 7.2 Hz, 6-H), 4.67 (2H, broad s, NHCOO), 4.03 (4H, t, J 6.2 Hz, $COOCH_2$), 3.83 (4H, t, J 7.2 Hz, $NCH_2$), 3.24 (411, q, J 5.2 Hz, $NHCONHCH_2$), 3.15 (4H, q, J 6.0 Hz, $CH_2NHCOO$), 1.71 (4H, m, $NCH_2CH_2$), 1.50 (4H, m, $NHCONHCH_2CH_2$), 1.31 (40H, m, $CH_2CH_2$), 0.88 (6H, q, J 6.4 Hz, $CH_2CH_3$), 0.51 (4H, m, $SiCH_2$), 0.06 (186H, m, $SiCH_3$);

$^{13}$C NMR (100 MHz; $CDCl_3$) δ 164.7 (C-4), 157.2 (C-2), 156.6 (NHCOO), 154.3 (NHCONH), 146.5 (C-6), 97.2 (C-5), 64.7 ($OCH_2$), 50.6 ($NCH_2$), 40.7 $NHCH_2$), 32.9 ($CH_2$), 31.2 ($CH_2$), 30.1 ($CH_2$), 29.8 ($CH_2$), 28.9 ($CH_2$), 23.0 ($CH_2$), 22.3 ($CH_2CH_3$), 18.0 ($SiCH_2$), 13.8 ($CH_3$), 1.05 ($SiCH_3$);

Compound SP13

$^1$H NMR (400 MHz; $CDCl_3$) δ 10.90 (2H, broad s, 7-H), 9.05 (2H, broad s, 9-H), 7.55 (2H, broad s, 5-H), 7.41 (2H, d, J 7.2 Hz, 6-H), 4.67 (2H, s, NHCOO), 4.03 (4H, t broad, $CH_2OCONH$), 3.78 (4H, t, J 7.3 Hz, $CH_2N$), 3.24 (4H, m, $NHCONHCH_2$), 3.14 (4H, m, $CH_2NHCOO$), 1.70-1.00 (470H, m, $CHCH_3$, $CH_2$), 0.81 (60H, m, $CH_3$);

$^{13}$C NMR (125 MHz; $CDCl_3$) δ 162.4 (C-4), 157.7 (C-2), 156.7 (NHCOO), 154.3 (NHCONH), 146.7 (C-6), 97.3 (C-5), 50.7 ($CH_2N$), 38.8 ($NHCONHCH_2$), 36.1 ($CH_2$), 33.4 ($CH_2$), 33.3 ($CH_2$), 33.2 ($CH_2$), 31.3 ($CH_2$), 30.6 ($CH_2$), 30.1 ($CH_2$), 30.0 ($CH_2$), 29.7 ($CH_2$), 29.3 ($CH_2$), 28.9 ($CH_2$), 26.7 ($CH_2$), 26.5 ($CH_2$), 26.1 ($CH_2$), 26.0 ($CH_2$), 25.9 ($CH_2$), 22.4 ($CH_2$), 13.9 ($CH_3$), 10.9 ($CH_3$).

Compound SP15

No purification required via flash silica chromatography: Slightly sticky white solid $^1$H NMR (400 MHz; $CDCl_3$) δ 10.90 (2H, broad s, 7-H), 9.03 (2H, broad s, 9-H), 7.55 (2H, broad s, 5-H), 7.41 (2H, d, J 7.2 Hz, 6-H), 4.85 (2H, s, NHCOO), 4.19 (4H, t broad, CH$_2$OCONH), 3.63-3.40 (210H, m, CH$_2$O, OCHCH$_3$, OCH$_2$CHCH$_3$), 3.24 (4H, q broad, NHCONHCH$_2$), 3.14 (4H, q broad, CH$_2$NHCOO), 1.75-1.1 (160H, m, CH$_2$+ CH$_3$CH), 0.81 (6H, t broad, CH$_3$);

$^{13}$C NMR (125 MHz; CDCl$_3$) δ 164.2 (C-4), 157.0 (C-2), 156.3 (NHCOO), 154.4 (NHCONH), 146.7 (C-6), 97.1 (C-5), 75.2 (CHO), 73.2 (CHO), 72.7 (CHO), 70.4 (CH$_2$O), 69.5 (CH$_2$O), 68.3 (CH$_2$O), 67.1 (CH$_2$O), 65.4 (CH$_2$O), 63.6 (CH$_2$O), 61.5 (CH$_2$O), 50.6 (CH$_2$N), 40.7 (CH$_2$NHCONH), 39.7 (CH$_2$NHCOO), 33.9 (CH$_2$), 31.8 (CH$_2$), 29.7 (CH$_2$), 29.2 (CH$_2$), 28.7 (CH$_2$), 27.9 (CH$_2$), 26.4 (CH$_2$), 26.1 (CH$_2$), 25.0 (CH$_2$), 22.5 (CH$_2$), 22.3 (CH$_2$), 20.7 (CH$_2$), 18.4 (CH$_2$), 17.2 (CH$_2$), 13.8 (CH$_3$).

Example 9

Synthesis of Mono Urea Polymers Using Polymers NH$_2$ Terminated and Cytosine Unit—Compounds SP21, SP23, SP25, SP27

To a solution of 4-amino-1-hexyl-1H-pyrimidin-2-one (C) (0.100 g, 0.513 mmol) in dry CH$_2$Cl$_2$ (7 ml) was added N,N carbonyl diimidazole (0.131 g, 0.513 mmol) and the solution was stirred at room temperature for 16 h. The solvent was evaporated and the residue redissolved in dry chloroform. Hexane was then added to precipitate the intermediate, which was dried in vacuo and used directly without further purification.

To a solution of each of Px, Pxi, Pxii Pxiii (0.296 g, 0.20 mmol) in dry THF (10 ml), was added the said intermediate (0.217 mg, 0.79 mmol). The reaction mixture was heated at reflux temperature for 20 h. The solution was evaporated in vacuo and the solid was then redissolved in CHCl$_3$ (20 ml) and washed with water (20 ml) and finally with saturated sodium chloride solution (20 ml). The organic phase was dried over MgSO$_4$. The solvents were evaporated in vacuo to give compounds SP21, SP23, SP25, SP27 respectively.

Purification over flash chromatography was required for some polymers (CHCl$_3$/MeOH 20:1 to 7:1).

Compound SP21

No purification required via flash silica chromatography: White waxy solid $^1$H NMR (300 MHz; CDCl$_3$) δ 10.59 (2H, broad s, 7-H), 9.11 (2H, broad s, 9-H), 7.41 (2H, d, J 6.9 Hz, 5-H), 7.20 (2H, d, J 7.2 Hz, 6-H), 3.70 (4H, t, J 7.4 Hz, NCH$_2$), 3.61 (140H, m, OCH$_2$), 3.30 (4H, q, J 5.8 Hz, NHCONHCH$_2$), 1.83 (4H, q, J 6.6 Hz, NCH$_2$CH$_2$), 1.68 (4H, quintet, J 6.9 Hz, NHCH$_2$CH$_2$), 1.22 (12H, m, CH$_2$), 0.84 (6H, t, J 6.1 Hz, CH$_2$CH$_3$);

$^{13}$C NMR (100 MHz; CDCl$_3$) δ 165.8 (C-4), 156.5 (C-2), 154.4 (NHCONH), 146.6 (C-6), 96.8 (C-5), 70.4 (OCH$_2$), 50.5 (CH$_2$N), 37.0 (NHCH$_2$), 31.2 (CH$_2$), 29.5 (CH$_2$), 28.7 (CH$_2$), 26.0 (CH$_2$), 22.3 (CH$_2$CH$_3$), 13.8 (CH$_3$);

Compound SP23

Purified via flash silica chromatography. Glassy solid $^1$H NMR (400 MHz; CDCl$_3$) δ 10.94 (2H, broad s, 7-H), 9.10 (2H, broad s, 9-H), 7.51 (2H, broad s, 5-H), 7.39 (2H, d, J 6.9 Hz, 6-H), 3.74 (4H, m, NCH$_3$), 3.56 (46H, m, OCH$_2$CH, OCH$_2$), 3.40 (6H, m, CH$_3$CB), 1.65 (4H, q, J 7.0 Hz, NCH$_2$CH$_2$), 1.24 (12H, m, CH$_2$), 1.16 (3H, d, J 6.5 Hz, CHCH$_3$), 1.08 (15H, m, CHCH$_3$), 0.83 (6H, m, CH$_2$CH$_3$);

$^{13}$C NMR (100 MHz; CDCl$_3$) δ 164.6 (C-4), 155.6 (C-2), 153.7 (NHCONH), 146.6 (C-6), 96.8 (C-5), 74.9 (OCH), 70.4 (OCH$_2$), 45.9 (NHCHCH$_3$), 45.6 (OCHCH$_3$), 50.5 (CH$_2$N), 30.7 (CH$_2$), 28.7 (CH$_2$), 26.0 (CH$_2$), 22.3 (CH$_2$CH$_3$), 16.9 (CHCH$_3$), 13.8 (CH$_3$);

Compound SP25

Purified via flash silica chromatography: Waxy pale yellow solid $^1$H NMR (300 MHz; CDCl$_3$) δ 10.85 (2H, broad s, 7-H), 9.02 (2H, broad s, 9-H), 7.55 (2H, broad s, 5-H), 7.42 (2H, d, J 7.1 Hz, 6-H), 3.82 (4H, t, J 7.3 Hz, NCH$_2$), 3.23 (4H, q, J 5.6 Hz, NHCH$_2$), 1.71 (4H, m, NCH$_2$CH$_2$), 1.58 (4H, m, NHCH$_2$CH$_2$), 1.30 (12H, m, CH$_2$), 0.87 (6H, q, J 5.8 Hz, CH$_2$CH$_3$), 0.57 (4H, q, J 8.0 Hz, SiCH$_2$), 0.06 (192H, m, SiCH$_3$);

$^{13}$C NMR (100 MHz; CDCl$_3$) δ 164.9 (C-4), 157.2 (C-2), 154.3 (NHCONH), 146.5 (C-6), 97.3 (C-5), 50.6 (NCH$_2$), 43.1 (NHCH$_2$), 31.3 (CH$_2$), 30.1 (CH$_2$), 28.8 (CH$_2$), 22.4 (CH$_2$CH$_3$), 15.4 (SiCH$_2$), 13.9 (CH$_3$), 1.0 (SiCH$_3$);

Example 10

Synthesis of Double Urea Polymers Using Cytosine Unit—Compounds SP29, SP31, SP33, SP35

To a solution of each of Px, Pxi, Pxii, Pxiii (0.206 g, 0.14 mmol) in dry chloroform (10 ml), was added compound (1-(1-Hexyl-2-oxo-1,2-dihydro-pyrimidin-4-yl)-3-(6-isocyanato-hexyl)-urea (N) (0.150 mg, 0.41 mmol). The reaction mixture was heated at reflux temperature for 20 h. Chloroform (10 ml) was then added and the mixture was filtered off in vacuo to remove the excess of isocyanate. The filtrate was concentrated down to 10 ml, and silica gel (200 mg) was added. The solution was heated at 60° C. for 2 h. The silica gel was then removed by filtration and the chloroform was evaporated in vacuo to give compounds SP 29, SP31, SP 33 and SP 35 respectively.

Purification over flash chromatography was needed for some polymers (MeOH/EtOAc 1/3 and CHCl$_3$/MeOH 7:1).

Compound SP29

No purification required via flash silica chromatography: Transparent brittle film H NMR (300 MHz; CDCl$_3$) δ 10.79 (2H, broad s, 7-H), 9.13 (2H, broad s, 9-H), 7.40 (2H, broad s, 5-H), 7.39 (2H, d, J 8.8 Hz, 6-H), 5.24 (2H, broad s, NHCONH), 5.03 (2H, broad s, NHCONH), 3.76 (4H, t, J 7.1 Hz, NCH$_2$), 3.58 (140H, m, OCH$_2$CH$_2$), 3.22 (8H, q, J 6.0 Hz, NHCONHCH$_2$), 3.07 (4H, q, J 6.0 Hz, NHCONHCH$_2$), 1.69 (4H, q, J 6.0 Hz, NCH$_2$CH$_2$), 1.50 (4H, m, OCH$_2$CH$_2$), 1.41 (8H, m, CH$_2$), 1.25 (16H, m, CH$_2$), 0.84 (6H, t, J 6.2 Hz, CH$_2$CH$_3$);

$^{13}$C NMR (100 MHz; CDCl$_3$) δ 164.4 (C-4), 158.7 (C-2), 156.9 (NHCONH), 154.3 (NHCONH), 146.7 (C-6), 96.8 (C-5), 70.3 (OCH$_2$), 50.5 (CH$_2$N), 39.9 (NHCONHCH$_2$), 38.1 (CH$_2$), 31.1 (CH$_2$), 29.4 (CH$_2$), 28.7 (CH$_2$), 26.3 (CH$_2$), 22.2 (CH$_2$CH$_3$), 13.8 (CH$_3$);

Compound SP31

Purified via flash silica chromatography: Opaque glassy solid $^1$H NMR (400 MHz, CDCl$_3$) δ 10.91 (2H, broad s, 7-H), 9.19 (2H, broad s, 9-H), 7.40 (2H, broad s, 5-H), 7.39 (2H, d, J 6.0 Hz, 6-1), 5.29 (2H, broad s, NHCONH), 5.19 (2H, broad s, NHCONH), 3.76 (4H, t, J 6.5 Hz, NCH$_2$), 3.60 (46H, m, OCH$_2$CH, OCH$_2$), 3.41 (6H, m, CH$_3$CH), 3.24 (4H, m, NHCONHCH$_2$), 3.27 (4H, m, CH$_2$NHCONH), 1.68 (4H, m, NCH$_2$CH$_2$), 1.42 (8H, m, CH$_2$), 1.31 (8H, m, CH$_2$), 1.27 (12H, m, J 8.8 Hz, CH$_2$), 1.09 (18H, m, CHCH$_3$), 0.84 (6H, m, CH$_2$CH$_3$);

$^{13}$C NMR (100 MHz; CDCl$_3$) δ 164.4 (C-4), 158.5 (C-2), 155.9 (NHCONH), 154.3 (NHCONH), 146.7 (C-6) 96.8 (C-5), 74.7 (CHO), 70.3 (OCH$_2$), 50.5 (CH$_2$N), 46.0 (CHNH), 39.8 (NHCH$_2$), 31.2 (CH$_2$), 28.7 (CH$_2$), 26.4 (CH$_2$), 22.3 (CH$_2$CH$_3$), 18.3 (CH$_3$), 16.8 (CH$_3$).

Compound SP33

No purification required via flash silica chromatography: Transparent glassy solid $^1$H NMR (300 MHz; CDCl$_3$) δ 10.90 (2H, broad s, 7-H), 8.95 (2H, broad s, 9-H), 7.70 (2H, broad s, 5-H), 7.44 (2H, d, J 7.1 Hz, 6-H), 4.91 (2H, broad s, NHCONH), 4.57 (2H, broad s, NHCONH), 3.81 (4H, m, J 7.2 Hz, NCH$_2$), 3.26 (8H, q, J 4.0 Hz, NHCONHCH$_2$), 3.13 (4H, m, CH$_2$NHCONH), 1.52 (4H, m, NCH$_2$CH$_2$), 1.71-1.30 (30H, m, CH$_2$), 0.87 (6H, q, J 6.5 Hz, CH$_2$CH$_3$), 0.55 (4H, m, J 8.5 Hz, SiCH$_2$), 0.07 (192H, m, J 7.7 Hz, SiCH$_3$);

$^{13}$C NMR (100 MHz, CDCl$_3$) δ 164.6 (C-4), 158.4 (C-2), 157.1 (NHCONH), 154.5 (NHCONH), 146.7 (C-6), 96.4 (C-5), 50.8 (CH$_2$N), 43.4 (CH$_2$NH), 39.6 (CH$_2$NH), 39.6 (CH$_2$), 31.3 (CH$_2$), 29.6 (CH$_2$), 28.8 (CH$_2$CH$_2$Si), 26.3 (CH$_2$), 22.4 (CH$_2$CH$_3$), 15.3 (CH$_2$Si), 13.9 (CH$_3$), 1.01 (CH$_3$Si);

Compound SP 35

No purification required via flash silica chromatography: Transparent solid $^1$H NMR (400 MHz; CDCl$_3$) δ 10.75 (2H, broad s, 7-H), 9.69 (2H, broad s, 9-H), 7.41 (4H, d, J 6.8 Hz, 5-H, 6-H), 5.36 (2H, broad s, NHCONH), 5.11 (2H, broad s, NHCONH), 3.67 (4H, q, J 7.7 Hz, NCH$_2$), 3.61 (340H, m, OCH$_2$), 3.32 (4H, q, J 4.2 Hz, NHCONHCH$_2$), 3.10 (4H, m, CH$_2$NHCONH), 1.69 (4H, m, NCH$_2$CH$_2$), 1.53 (12H, m, CH$_2$), 1.44 (4H, m, CH$_2$), 1.21 (12H, m, CH$_2$), 0.85 (6H, m, J 6.5 Hz, CH$_3$);

$^{13}$C NMR (100 MHz; CDCl$_3$) δ 169.9 (C-4), 162.3 (C-2), 160.9 (NHCONH), 159.3 (NHCONH), 147.0 (C-6), 96.3 (C-5), 70.1 (OCH$_2$), 50.7 (CH$_2$N), 39.9 (NHCH$_2$), 31.1 (CH$_2$), 29.5 (CH$_2$), 28.7 (CH$_2$), 26.2 (CH$_2$), 22.3 (CH$_2$CH$_3$), 13.8 (CH$_3$);

Example 11

Synthesis N-1 Polymers of Compounds SP37, SP38, SP39, SP40

To a solution of each of Px, Pxi, Pxii, Pxiii, (0.350 g, 1.04 mmol) in dry THF (15 ml) is added the imidazolide (0.180 g, 4.17 mmol). The solution is heated at reflux for 16 h. After cooling down the solution is evaporated to dryness and the residue is redissolved in chloroform. The organic phase is washed with water (10 ml) and brine (20 ml) and the then dried over MgSO$_4$. The solvents are evaporated under vacuum and the solid is purified through flash silica gel chromatography using first (MeOH/EtOAc 1:2) then CHCl$_3$/MeOH (7/1) to give the compounds SP37, SP38, SP39, SP40 respectively in approximately 45% yield.

Compound SP37

$^1$H NMR (500 MHz, CDCl$_3$) δ 10.84 (2H, broad s, H-7), 8.89 (2H, broad s, H-9), 7.47 (2H, broad s, H-5), 7.43 (2H, d, J 7.1 Hz, H-6), 5.20 (2H, broad s, H-23), 4.95 (2H, broad s, H-22), 3.76 (4H, m, H-16), 3.60-3.40 (130H, m, CH$_2$O), 3.21 (8H, m, H-24 &H-10), 3.10 (4H, m, H-21), 1.69 (8H, m, CH$_2$), 1.55-1.24 (28H, m, CH$_2$), 0.83 (6H, t, J 6.6 Hz, CH$_3$);

$^{13}$C NMR (100 MHz, CDCl$_3$) δ 164.7 (C-4), 158.8 (CH$_2$NHCONHCH$_2$), 157.1 (C-2), 154.3 (C-8), 146.8 (C-6), 97.1 (C-5), 70.5 (CH$_2$CH$_2$O), 69.8 (NHCH$_2$CH$_2$O), 69.6 (NHCH$_2$CH$_2$O), 50.6 (CH$_2$N), 40.0 (OCH$_2$CH$_2$NH), 40.0 (CH$_2$NHCONHCH$_2$CH$_2$O), 38.5 (CH$_2$NH), 31.5 (CH$_2$), 30.7 (CH$_2$), 29.3 (CH$_2$), 28.8 (CH$_2$), 26.6 (CH$_2$), 26.4 (CH$_2$), 26.1 (CH$_2$), 22.6 (CH$_2$), 14.1 (CH$_3$).

Compound SP38

$^1$H NMR (500 MHz, CDCl$_3$) δ 10.85 (2H, broad s, H-7), 8.92 (2H, broad s, H-9), 7.49 (2H, broad s, H-5), 7.42 (2H, d, J 7.1 Hz, H-6, 4.93-5.20 (4H, broad s, NHCONH), 3.76 (4H, m, H-16), 3.60-3.40 (216H, m, CH$_2$O+CHCH$_3$), 3.20 (4H, m, H-10), 3.10 (4H, m, H-21), 1.69 (4H, m, CH$_2$), 1.55-1.24 (28H, m, CH$_2$), 1.08 (23H, m, CH$_3$), 0.83 (6H, t, J 6.6 Hz, CH$_3$);

$^{13}$C NMR (100 MHz, CDCl$_3$) δ 164.7 (C-4), 158.4 (CH$_2$NHCONHCH(CH$_3$)), 157.1 (C-2), 154.2 (C-8), 146.8 (C-6), 97.1 (C-5), 75.1 (OCHCH$_3$), 70.5 (CH$_2$CH$_2$O), 50.5 (CH$_2$N), 46.2 (NHCONHCH(CH$_3$)), 40.0 (CH$_2$NHCONHCH$_2$CH(CH$_3$)O+C-10), 31.4 (CH$_2$), 30.2 (CH$_2$), 29.3 (CH$_2$), 28.8 (CH$_2$), 26.6 (CH$_2$), 26.4 (CH$_2$), 26.1 (CH$_2$), 22.5 (CH$_2$), 18.4 (OCH(CH$_3$)), 17.0 (NHCHCH$_3$), 13.0 (CH$_2$CH$_3$).

Compound SP39

$^1$H NMR (500 MHz, CDCl$_3$) δ 10.88 (2H, broad s, H-7), 8.92 (2H, broad s, H-9), 7.49 (2H, broad s, H-5), 7.42 (2H, d, J 7.1 Hz, H-6), 4.45 (4H, broad s, NHCONH), 3.78 (4H, m, H-16), 3.22 (4H, m, H-10), 3.10 (8H, m, CH$_2$CH$_2$NHCONHCH$_2$CH$_2$CH$_2$Si+ NHCONHCH$_2$CH$_2$CH$_2$Si), 1.55-1.24 (36H, m, CH$_2$), 0.83 (6H, t, J 6.6 Hz, CH$_3$), 0.50 (4H, m, CH$_2$Si), 0.08 (250H, s, CH$_3$Si);

$^{13}$C NMR (100 MHz, CDCl$_3$) δ$^{13}$C NMR (100 MHz, CDCl$_3$) δ 164.6 (C-4), 158.2 (CH$_2$NHCONHCH$_2$), 157.1 (C-2), 154.3 (C-8), 146.7 (C-6), 97.1 (C-5), 50.5 (CH$_2$N), 43.3 (OSiCH$_2$CH$_2$CH$_2$NH), 40.1 (H-10+CH$_2$NHCONH(CH$_2$)$_3$SiO), 33.0 (CH$_2$NHCH$_2$CH$_2$Si)), 31.5 (CH$_2$), 30.0 (CH$_2$), 29.4 (CH$_2$), 28.8 (CH$_2$), 26.6 (CH$_2$), 26.3 (CH$_2$), 26.0 (CH$_2$), 24.1 (CH$_2$), 22.6 (CH$_2$), 15.3 (CH$_2$Si), 14.0 (CH$_3$), 0.7 (CH$_3$Si).

Compound SP40

$^1$H NMR (400 MHz, CDCl$_3$) δ 10.89 (2H, broad s, H-7), 8.88 (2H, broad s, H-9), 7.51 (2H, broad s, H-5), 7.44 (2H, d, J 7.3 Hz, H-6), 5.28 (2H, broad s, H-24), 5.10 (2H, broad s, H-22), 3.80 (4H, m, H-16), 3.60-3.40 (150H, m, CH$_2$O), 3.33 (4H, dd, J 5.3 Hz, H-25), 3.23 (4H, dd, J 6.7 Hz, H-10), 3.12 (4H, dd, J 5.5 Hz, H-21), 1.72 (4H, m, CH$_2$), 1.55-1.24 (28H, m, CH$_2$), 0.86 (6H, t, J 6.6 Hz, CH$_3$);

$^{13}$C NMR (125 MW CDCl$_3$) δ 164.7 (C-4), 158.7 (CH$_2$NHCONHCH$_2$), 156.2 (C-2), 154.2 (C-8), 146.7 (C-6), 97.0 (C-5), 70.4 (CH$_2$CH$_2$O), 70.2 (NHCH$_2$CH$_2$O), 69.8 (NHCH$_2$CH$_2$O), 50.5 (CH$_2$N), 40.1 (OCH$_2$CH$_2$NH), 40.0 (CH$_2$NHCONHCH$_2$CH$_2$O), 39.9 (CH$_2$NH), 31.4 (CH$_2$), 30.1 (CH$_2$), 29.6 (CH$_2$), 29.3 (CH$_2$), 28.7 (CH$_2$), 26.5 (CH$_2$), 26.3 (CH$_2$), 26.1 (CH$_2$), 22.6 (CH$_2$), 13.9 (CH$_3$).

Example 12

Synthesis of Polymers Using Cytosine Unit, Compound SP41 and SP43

To a solution of each of polymers Pxi, Pxii (0.734 g, 0.36 mmol) in dry chloroform (20 ml), was added (1-(1-Hexyl-2-oxo-1,2-dihydro-pyrimidin-4-yl)-3-(6-isocyanato-hexyl)-urea (N) (0.400 mg, 1.10 mmol) with the addition of one drop of dibutyltindilaurate, and the reaction mixture was heated at reflux temperature for 20 h. Chloroform (10 ml) was then added and the mixture was filtered off in vacuo to remove the excess of isocyanate. The filtrate was concentrated down to 10 ml, and silica gel (300 mg) was added with a further drop of dibutyltindilaurate. The solution was heated at 60° C. for 2 h. The silica gel was then removed by filtration and the chloroform was evaporated without using vacuum to give compound 41 in 39% yield.

No purification needed.

Example 13

Synthesis of Polymer using Cyto Unit, SP45

To a solution of the polymer (PEG 300) (0.129 g, 0.45 mmol) in dry chloroform (20 ml), was added (1-(1-Hexyl-2-oxo-1,2-dihydro-pyrimidin-4-yl)-3-(6-isocyanato-hexyl)-urea (N) (0.500 mg, 1.4 mmol) with the addition of one drop of dibutyltindilaurate, and the reaction mixture was heated at reflux temperature for 20 h. Chloroform (10 ml) was then added and the mixture was filtered off in vacuo to remove the excess of isocyanate. The filtrate was concentrated down to 10 ml, and silica gel (300 mg) was added with a further drop of dibutyltindilaurate. The solution was heated at 60° C. for 2 h. The silica gel was then removed by filtration and the chloroform was evaporated under vacuum to give compound 45 in 39% yield.

White Solid $^1$H NMR (400 MHz; CDCl$_3$) δ 10.89 (2H, broad s, 7-H), 8.99 (2H, broad s, 9-H), 7.52 (2H, broad s, 5-H), 7.43 (2H, d, J 6.9 Hz, 6-H), 5.03 (2H, broad s, NHCOO), 4.18 (4H, t broad, CH$_2$OCONH), 3.80 (4H, t, J 7.2 Hz, CH$_2$N), 3.62 (20H, m, OCH$_2$), 3.22 (4H, m, NHCONHCH$_2$), 3.11 (4H, m, CH$_2$NHCOO), 1.70-1.45 (16H, m, CH$_2$CH$_2$), 1.29 (16H, m, CH$_2$), 0.86 (6H, m, CH$_3$);

$^{13}$C NMR (100 MHz; CDCl$_3$) δ 173.1 (C-4), 157.1 (C-2), 156.3 (NHCOO), 154.3 (NHCONH, 146.7 (C-6), 97.2 (C-5), 70.4 (CH$_2$O), 69.6 (CH$_2$O), 50.7 (CH$_2$N), 40.7 (CH$_2$NHCOO), 39.7 (NHCONHCH$_2$), 34.0 (CH$_2$), 31.2 (CH$_2$), 29.5 (CH$_2$), 29.2 (CH$_2$), 28.8 (CH$_2$), 26.0 (CH$_2$), 25.1 (CH$_2$), 14.0 (CH$_3$).

Example 14

Synthesis of Polymer Using Cyto Unit and HTPB, SP47

To a solution of the polymer Pix (HTPB 2800) (0.540 g, 0.27 mmol) in dry chloroform (20 ml), was added (1-(1-Hexyl-2-oxo-1,2-hydro-pyrimidin-4-yl)-3-(6-isocyanato-hexyl)-urea (N) (0.300 mg, 0.82 mmol) with the addition of one drop of dibutyltindilaurate, and the reaction mixture was heated at reflux temperature for 20 h. Chloroform (10 ml) was then added and the mixture was filtered off in vacuo to remove the excess of isocyanate. The filtrate was concentrated down to 10 ml, and silica gel (300 mg) was added with a further drop of dibutyltindilaurate. The solution was heated at 60° C. for 2 h. The silica gel was then removed by filtration and the chloroform was evaporated under vacuum to give compound SP47 in 40% yield.

$^1$H NMR (400 MHz; CDCl$_3$) δ 10.89 (2K, broad s, 7-H), 9.04 (2H, broad s, 9-H), 7.69 (2H, broad s, 5-H), 7.52 (2H, d, J 5.9 Hz, 6-H), 5.57-5.36, 4.95 (212H, m, OCH$_2$), 4.91 (21, broad s, NHCOO), 4.5-4 (4H, broad m, OCH$_2$ trans, cis, vinyl)$^a$, 3.81 (411, t, J 7.2 Hz, CH$_2$N), 3.24 (4H, broad q, NHCONHCH$_2$), 3.14 (4H, broad q, CH$_2$NHCOO), 2.02 (106H, m, CB), 1.71-1.22 (32H, m, NHCH$_2$CH$_2$, CH$_2$), 0.87 (6H, t, J 6.1 Hz, CH$_2$CH$_3$);

$^{13}$C NMR (100 MHz; CDCl$_3$) δ 164.7 (C-4), 157.0 (NH-COO), 156.0 (C-2), 154.4 (NHCONH), 146.7 (C-6), 129.9 (CH═CH), 97.3 (C-5), 65.4 (CH$_2$OCONH vinyl)$^a$, 62.5 (CH$_2$OCONH trans)$^a$, 58.4 (CH$_2$OCONH cis)$^a$, 50.7 (CH$_2$N), 40.9 (CH$_2$NHCOO), 39.8 (NHCONHCH$_2$), 33.9 (CH$_2$), 32.6 (CH$_2$), 31.3 (CH$_2$), 29.3 (CH$_2$), 27.3 (CH$_2$), 24.8 (CH$_2$), 22.4 (CH$_2$CH$_3$), 13.9 (CH$_3$).

Analysis

Hetero-Assembled Dimers

Figure 9:
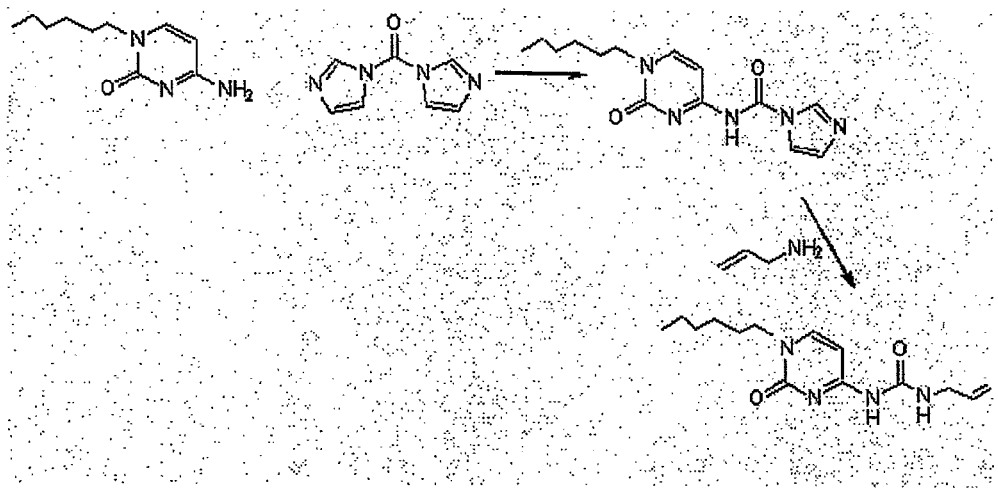
FIG. 9 shows the synthetic route for the preparation of cytosine module according to the invention, 1-Allyl-3-(1-hexyl-2-oxo-1,2-dihydro-pyrimidin-4-yl)-urea, including a functionalised end group
Figure 10:
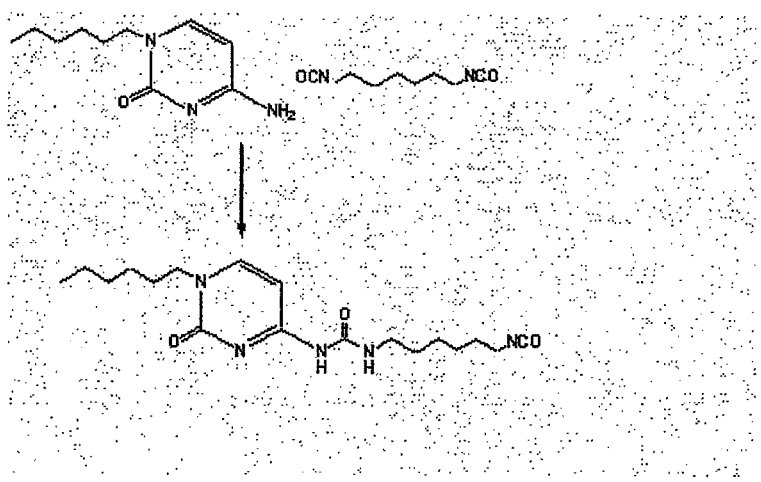
FIG. 10 shows the synthetic route for the preparation of cytosine module according to the invention, (1-(1-Hexyl-2-oxo-1,2-dihydro-pyrimidin-4-yl)-3-(6-isocyanato-hexyl)-urea, including a functionalised end group FIG. 11 shows a synthetic route for the preparation of a polymer of formula (II) according to the invention FIG. 12 shows the homo and hetero dimeric assembly of a cytosine monomer of formula I and a UPy monomer, where 1 is the cytosine monomer and 2 is the UPy monomer FIG. 13 shows the self-assembled supramolecular structure of compounds of the formula (II)
Figure 11:
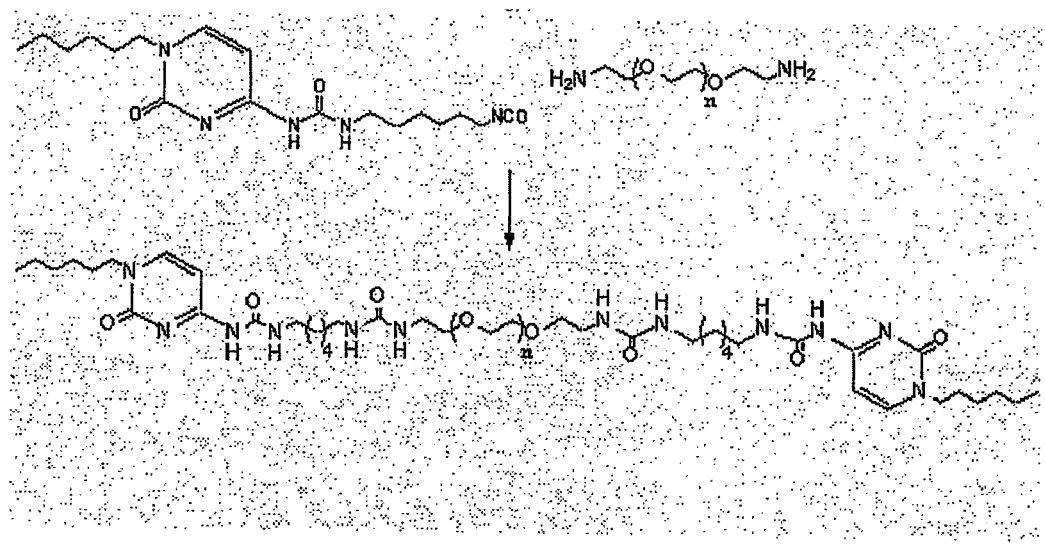
Figure 12:
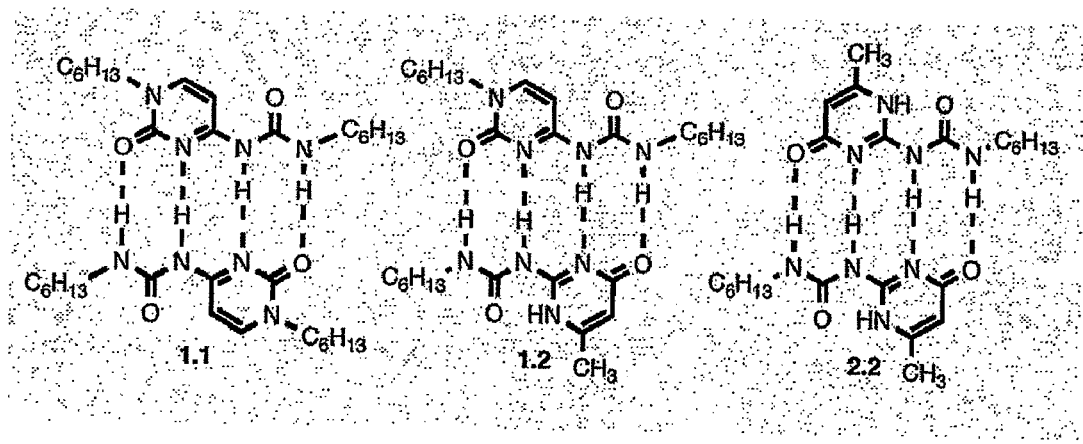
Figure 13:
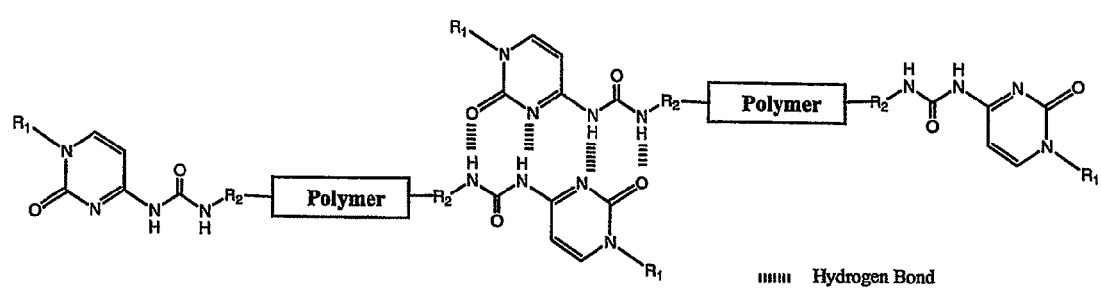

The capacity of the new module, shown as 1 in FIG. 9, to disrupt the strong UPy, shown as 2 in FIG. 9, dimerisation was explored in order to reveal its potential for the construction of hetero-assembled supramolecular copolymers. In particular, the hetero-association of 1 and UPy 2 (FIG. 9) via a strong quadruple hydrogen bonding interaction was examined.

Single crystal XRD of 1 (from chloroform) revealed the presence of quadruple hydrogen bonding with the outer hydrogen bonds N—H . . . O (d=1.86 Å, D=2.74 Å, θ=168°) shorter than the inner N—H . . . N (d=2.26 Å, D=3.14 Å, θ=173°) bonds. The side chain carbonyl and the 5-H of the ring were nearly planar with the measured geometry of the intramolecular interaction between 5-H . . . O═C-8 (d=2.15 Å, D=2.77 Å, θ=122°) in agreement with that for a weak hydrogen bond. In addition, a short intermolecular distance between 6-H . . . O═C-8 (d=2.24 Å, D=3.16 Å, θ=166°) was observed. This ordering of the planar dimers in the crystal with a 3.2 Å interlayer separation suggested that polymers based on 1 are also stabilized via stacking-type interactions.

The invention claimed is:

1. A compound of the formula (II):

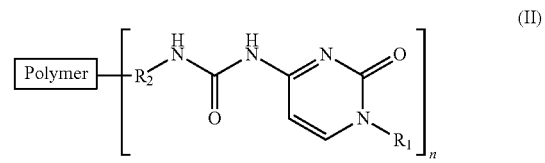

(II)

wherein:

$R_1$ is independently selected from:
an alkyl or alkenyl or alkoxy or aryl or aryloxy carbohydrate based group;
or an alkyl or alkenyl or alkoxy or aryl or aryloxy perfluorinated carbohydrate based group;
or an alkyl or alkenyl or alkoxy or aryl or aryloxy cyclic carbohydrate based group;
or an alkyl or alkenyl or alkoxy or aryl or aryloxy heterocyclic carbohydrate based group; or
a UV active chromaphore, $R_2$ is independently selected from:
an alkyl or alkenyl or alkoxy or aryl or aryloxy carbohydrate based group;
or an alkyl or alkenyl or alkoxy or aryl or aryloxy perfluorinated carbohydrate based group;
or an alkyl or alkenyl or alkoxy or aryl or aryloxy cyclic carbohydrate based group;
or an alkyl or alkenyl or alkoxy or aryl or aryloxy heterocyclic carbohydrate based group, and
the polymer is independently a polymeric material between 200 and 500,000 Da, and n is greater than or equal to two.

2. The compound of claim 1 wherein:

$R_1$ is independently selected from:
a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy carbohydrate based group;
or a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy perfluorinated carbohydrate based group;
or a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy cyclic carbohydrate based group;

or a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy heterocyclic carbohydrate based group;

or a UV active chromaphore, $R_2$ is independently selected from:

a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy carbohydrate based group;

or a branched or linear $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy perfluorinated carbohydrate based group;

or a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy cyclic carbohydrate based group;

or a $C_1$-$C_{20}$ alkyl or $C_1$-$C_{20}$ alkenyl or $C_1$-$C_{20}$ alkoxy or $C_1$-$C_{20}$ aryl or $C_1$-$C_{20}$ aryloxy heterocyclic carbohydrate based group, and the polymer is independently selected from group consisting of:

polyethylene glycol, polymethylmethacrylate, polycarbonate, polyorganophosphazene, polysiloxane, polyN-IMMO, polyGLYN, polybutylene and polybutadiene, and n is greater than or equal to two and less than 50.

3. A method of synthesizing the compound of formula (II),

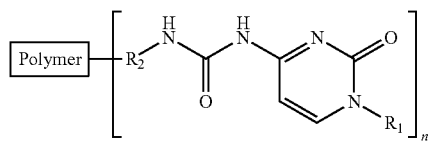
(II)

wherein:

$R_1$ is independently selected from:

an alkyl or alkenyl or alkoxy or aryl or aryloxy carbohydrate based group;

or an alkyl or alkenyl or alkoxy or aryl or aryloxy perfluorinated carbohydrate based group;

or an alkyl or alkenyl or alkoxy or aryl or aryloxy cyclic carbohydrate based group;

or an alkyl or alkenyl or alkoxy or aryl or aryloxy heterocyclic carbohydrate based group; or a UV active chromaphore R2 is independently selected from:

an alkyl or alkenyl or alkoxy or aryl or aryloxy carbohydrate based group;

or an alkyl or alkenyl or alkoxy or aryl or aryloxy perfluorinated carbohydrate based group;

or an alkyl or alkenyl or alkoxy or aryl or aryloxy cyclic carbohydrate based group;

or an alkyl or alkenyl or alkoxy or aryl or aryloxy heterocyclic carbohydrate based group, and the polymer is independently a polymeric material between 200 and 500,000 Da and n is greater than or equal to two, comprising:

(i) selectively protecting a primary amine of cytosine using an acid anhydride and base to produce the corresponding amide;

(ii) reacting a secondary amine of cytosine with a monofunctional or polyfunctional electrophile in the presence of a base to produce a tertiary amine;

(iii) deprotecting the protecting group present on the primary amine group using basic conditions; and (iv) reacting the primary amine from step (iii) with N,N carbonyl diimidazole (CDI) to form an electrophile and reaction of the electrophile with a polyfunctional polymer to produce the corresponding polymer of formula (II).

4. A supramolecular polymer containing units of the formula:

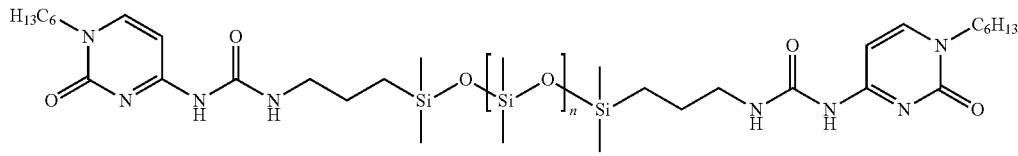

wherein n is approximately 30.

5. A supramolecular polymer containing units of the formula:

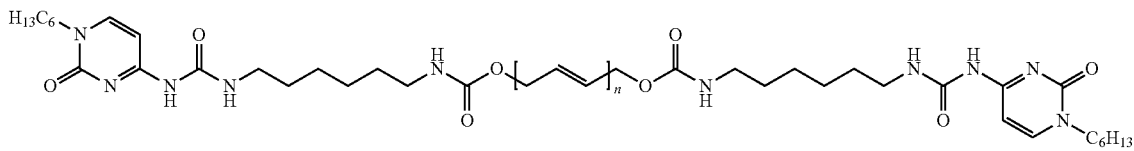

n - 53 wherein n is 53.

6. A supramolecular material having the formula:

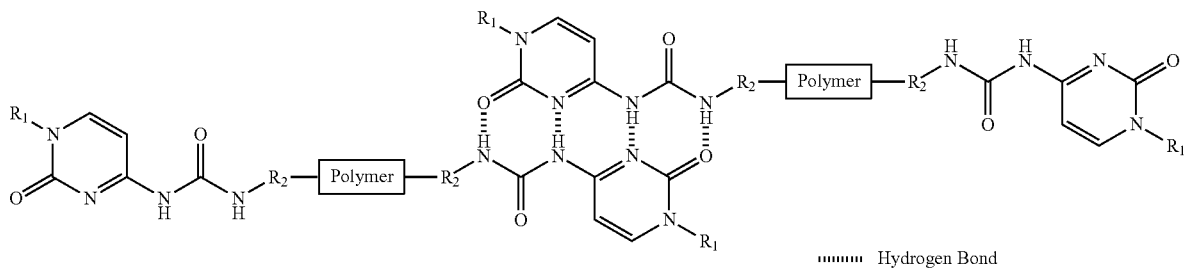

....... Hydrogen Bond wherein:

$R_1$ is independently selected from:

an alkyl or alkenyl or alkoxy or aryl or aryloxy carbohydrate based group;

or an alkyl or alkenyl or alkoxy or aryl or aryloxy perfluorinated carbohydrate based group;

or an alkyl or alkenyl or alkoxy or aryl or aryloxy cyclic carbohydrate based group;

or an alkyl or alkenyl or alkoxy or aryl or aryloxy heterocyclic carbohydrate based group; or a UV active chromaphore;

$R_2$ is independently selected from:

an alkyl or alkenyl or alkoxy or aryl or aryloxy carbohydrate based group;

or an alkyl or alkenyl or alkoxy or aryl or aryloxy perfluorinated carbohydrate based group;

or an alkyl or alkenyl or alkoxy or aryl or aryloxy cyclic carbohydrate based group;

or an alkyl or alkenyl or alkoxy or aryl or aryloxy heterocyclic carbohydrate based group; and the polymer is independently a polymeric material between 200 and 500,000 Da.

* * * * *